(12) United States Patent
Patel

(10) Patent No.: US 7,769,497 B2
(45) Date of Patent: Aug. 3, 2010

(54) METHOD OF SUPER SUPER DECOUPLED LOADFLOW COMPUTATION FOR ELECTRICAL POWER SYSTEM

(76) Inventor: Sureshchandra B. Patel, 37 Miller Street, Toronto, Ontario (CA) M6N 2Z6

( * ) Notice: Subject to any disclaimer, the term of this patent is extended or adjusted under 35 U.S.C. 154(b) by 1079 days.

(21) Appl. No.: 10/570,023

(22) PCT Filed: Aug. 29, 2003

(86) PCT No.: PCT/CA03/01312
§ 371 (c)(1),
(2), (4) Date: Mar. 1, 2006

(87) PCT Pub. No.: WO2004/023622
PCT Pub. Date: Mar. 18, 2004

(65) Prior Publication Data
US 2008/0281474 A1 Nov. 13, 2008

(51) Int. Cl.
| | |
|---|---|
| G01R 31/00 | (2006.01) |
| G01R 19/00 | (2006.01) |
| H02J 1/00 | (2006.01) |
| H02J 3/46 | (2006.01) |
| G05F 1/70 | (2006.01) |
| G05B 24/02 | (2006.01) |
| H02J 3/12 | (2006.01) |
| G01R 29/00 | (2006.01) |
| G01R 17/02 | (2006.01) |
| H02H 9/00 | (2006.01) |
| H02H 3/24 | (2006.01) |

(52) U.S. Cl. ............... 700/298; 700/293; 702/58; 702/64; 307/20; 307/68; 323/205; 323/268; 323/318; 324/76.79; 324/76.81; 324/98; 340/658; 340/662; 340/663; 361/18; 361/62; 361/90; 363/74

(58) Field of Classification Search ......... 700/292–295, 700/297, 298; 702/57–59, 64, 65, 182; 307/20, 307/68; 323/205, 318, 268; 324/76.77, 76.79, 324/76.81, 98, 500, 512, 521, 522, 537; 340/500, 340/540, 635, 657, 658, 600–664; 361/1, 361/18, 52, 54, 57, 62–64, 67, 88, 90, 91.1, 361/92; 363/74
See application file for complete search history.

(56) References Cited

U.S. PATENT DOCUMENTS 4,868,410 A * 9/1989 Nakamura .................. 307/20
(Continued)

FOREIGN PATENT DOCUMENTS

CA 2107388 A * 5/1995
WO WO 2004023622 A2 * 3/2004

OTHER PUBLICATIONS

Patel, S.B., "Fast super decoupled loadflow," IEE Proceedings on Generation, Transmission and Distribution, vol. 139, Issue 1, Jan. 1992, pp. 13-20.*

(Continued)

*Primary Examiner* — Crystal J Barnes-Bullock

(57) ABSTRACT

A method of performing loadflow calculations for controlling voltages and power flow in a power network by reading on-line data of given/specified/scheduled/set network variables/parameters and using control means, so that no component of the power network is overloaded as well as there is no over/under voltage at any nodes in the network following a small or large disturbances. The invented generalized Super Super Decoupled Loadflow (SSDL) calculation method is characterized in that 1) modified real power mismatch at any PQ-node-p is calculated as $RP_p = [\Delta P_p' + (G_{pp}'/B_{pp}')\Delta Q_p']/V_p^2$, which takes different form for different manifestation of the generalized version SSDL-X'X' method, 2) transformed values of known/given/specified/scheduled/set quantities in the diagonal elements of the gain matrix [YV] of the Q-V sub-problem are present, and 3) transformation angles are restricted to maximum of $-48°$ particularly for the most successful version SSDL-YY method, and these inventive loadflow calculation steps together yield some processing acceleration and consequent efficiency gains, and are each individually inventive. The other two Super Super Decoupled Loadflow methods: BGX' version (SSDL-BGX') and X'G$_{pv}$X' version (SSDL-X'G$_{pv}$X') are characterized in the use of simultaneous (1V, 1θ) iteration scheme thereby calculating mismatches only once in each iteration and consequent efficiency gain.

2 Claims, 11 Drawing Sheets

Loadflow Calculation in Power Flow Control and/or Voltage Control in Electrical Power System

U.S. PATENT DOCUMENTS

| | | | | |
|---|---|---|---|---|
| 4,974,140 | A * | 11/1990 | Iba et al. | 363/74 |
| 5,081,591 | A * | 1/1992 | Hanway et al. | 323/205 |
| 5,305,174 | A * | 4/1994 | Morita et al. | 361/63 |
| 5,566,085 | A * | 10/1996 | Marceau et al. | 700/293 |
| 5,610,834 | A * | 3/1997 | Schlueter | 700/293 |
| 6,191,568 | B1 * | 2/2001 | Poletti | 323/268 |
| 6,313,752 | B1 * | 11/2001 | Corrigan et al. | 340/657 |
| 6,690,175 | B2 * | 2/2004 | Pinzon et al. | 324/525 |
| 6,754,597 | B2 * | 6/2004 | Bertsch et al. | 702/57 |
| 6,917,124 | B2 * | 7/2005 | Shetler et al. | 307/66 |
| 7,096,165 | B2 * | 8/2006 | Pantenburg et al. | 703/1 |
| 7,096,175 | B2 * | 8/2006 | Rehtanz et al. | 703/18 |
| 7,519,506 | B2 * | 4/2009 | Trias | 702/182 |
| 2007/0203658 | A1 * | 8/2007 | Patel | 702/60 |

OTHER PUBLICATIONS

Patel, S.B., "Transformation Based Fast Decoupled Loadflow," IEEE Region 10 International Conference on EC3-Energy, Computer, Communication and Control Systems, vol. 1, Aug. 28-30, 1991, pp. 183-187.*

Van Amerongen, R.A.M., "A general-purpose version of the fast decoupled load flow," IEEE Transactions on Power Systems, vol. 4, Issue 2, May 1989, pp. 760-770.*

Allan, R.N. et al. "LTC Transformers and MVAR Violations in the Fast Decoupled Load Flow," IEEE Transactions on Power Apparatus and Systems, vol. PAS-101, Issue 9, Sep. 1982, pp. 3328-3332.*

* cited by examiner

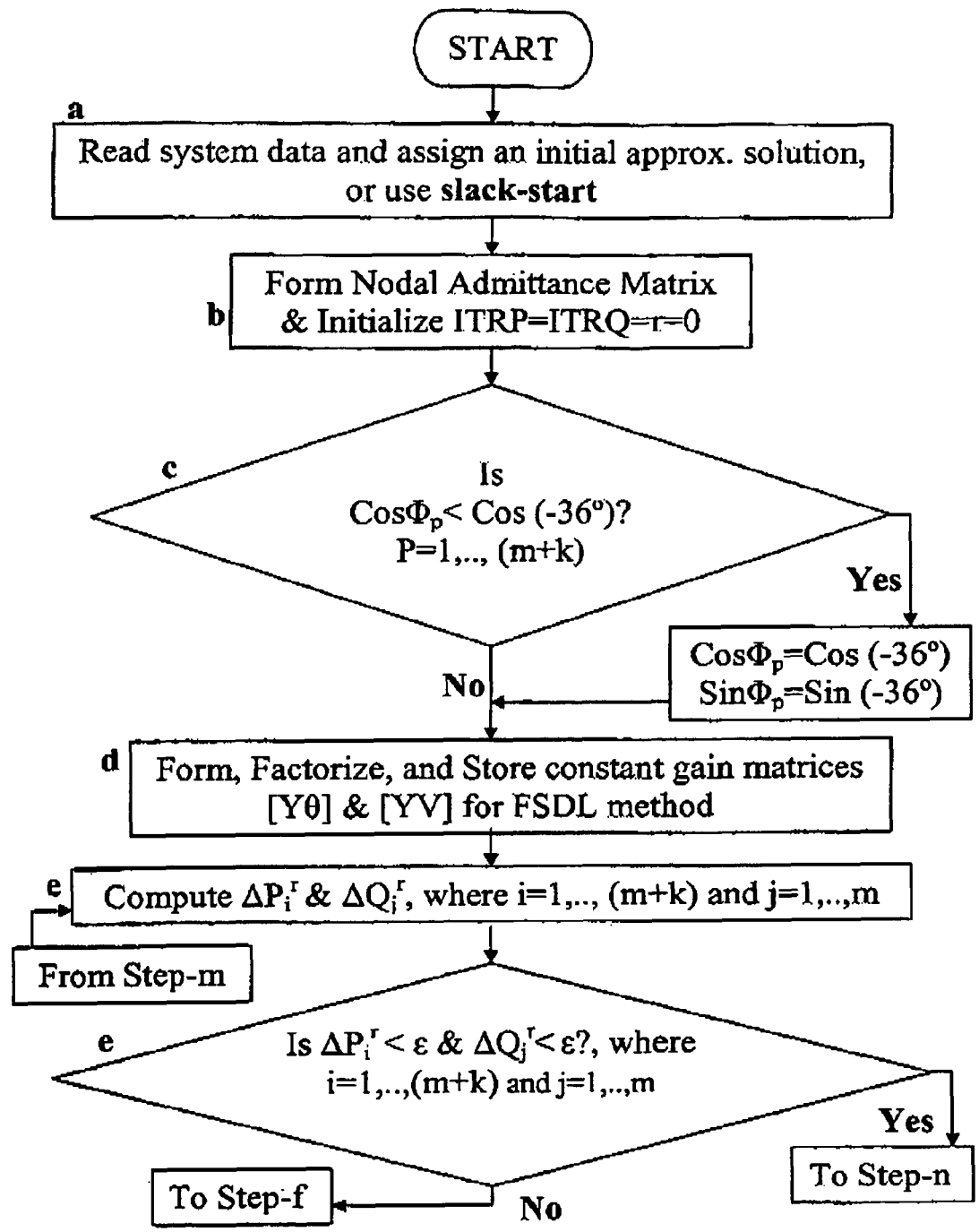
Fig.1: Prior Art: Flow-chart of Fast Super Decoupled Loadflow (FSDL) method

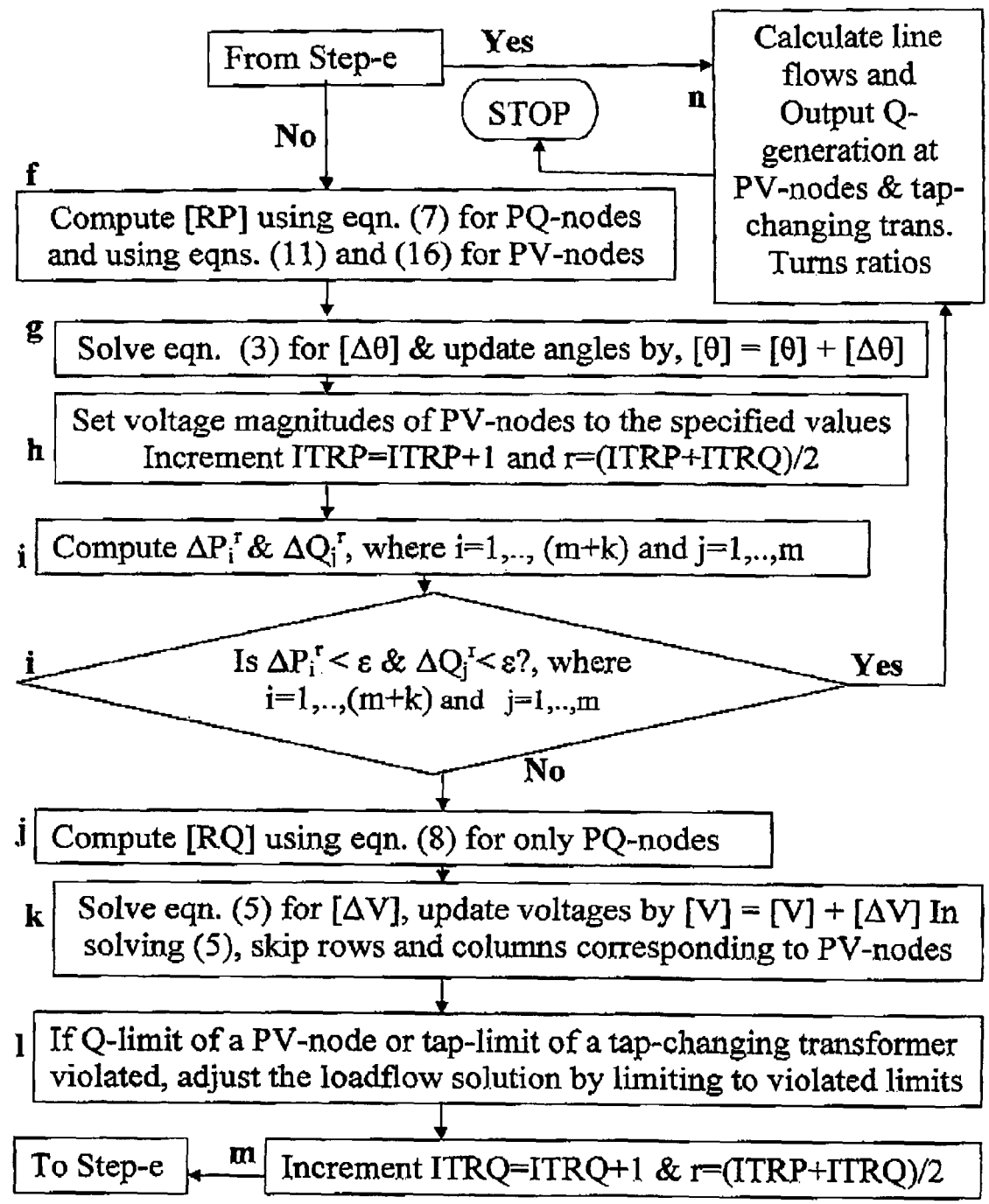
Fig.1: Prior Art: Flow-chart of Fast Super Decoupled (Cont.) Loadflow (FSDL) method

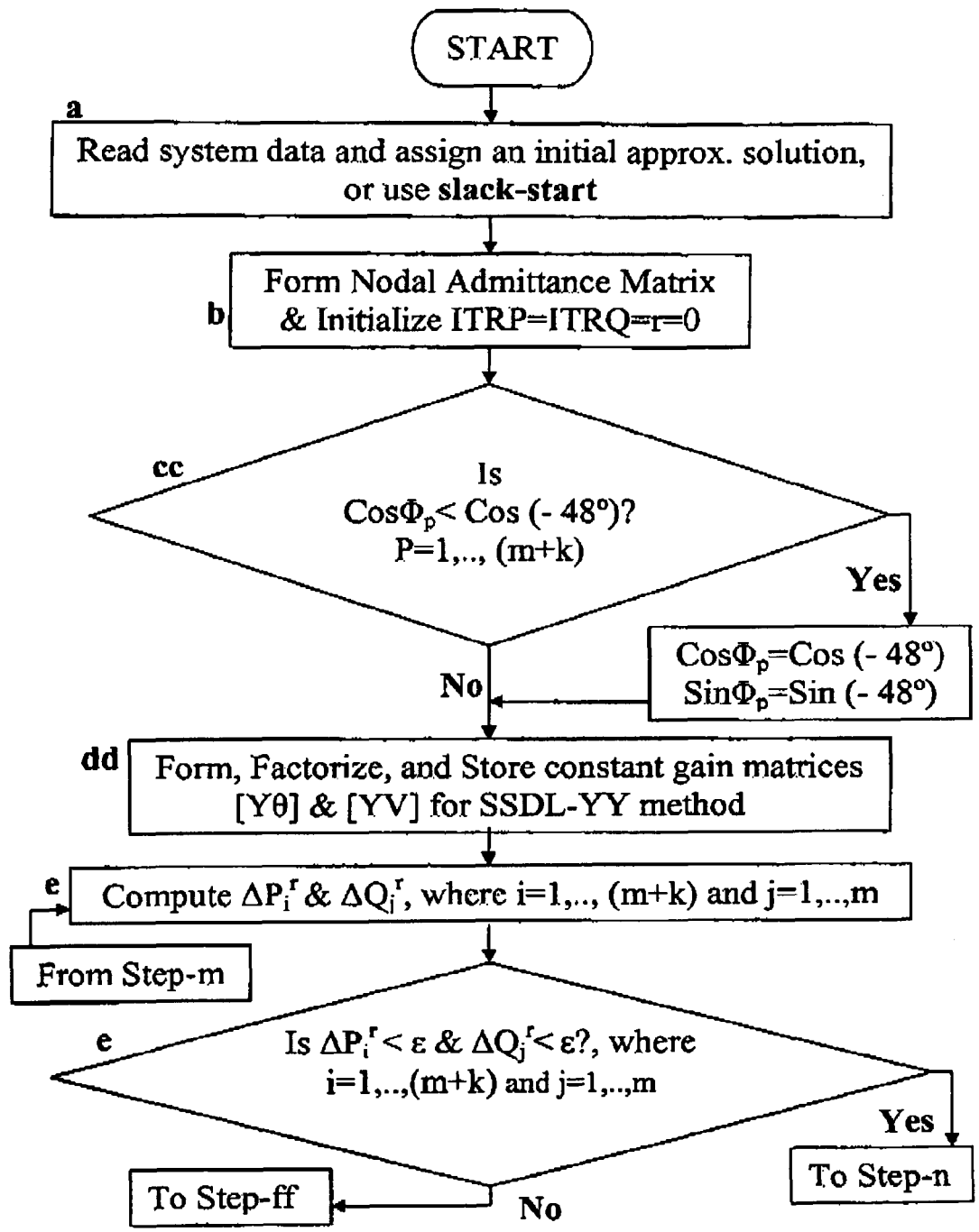
Fig.2: Invention: Flow-chart of Super Super Decoupled Loadflow (SSDL-YY) method

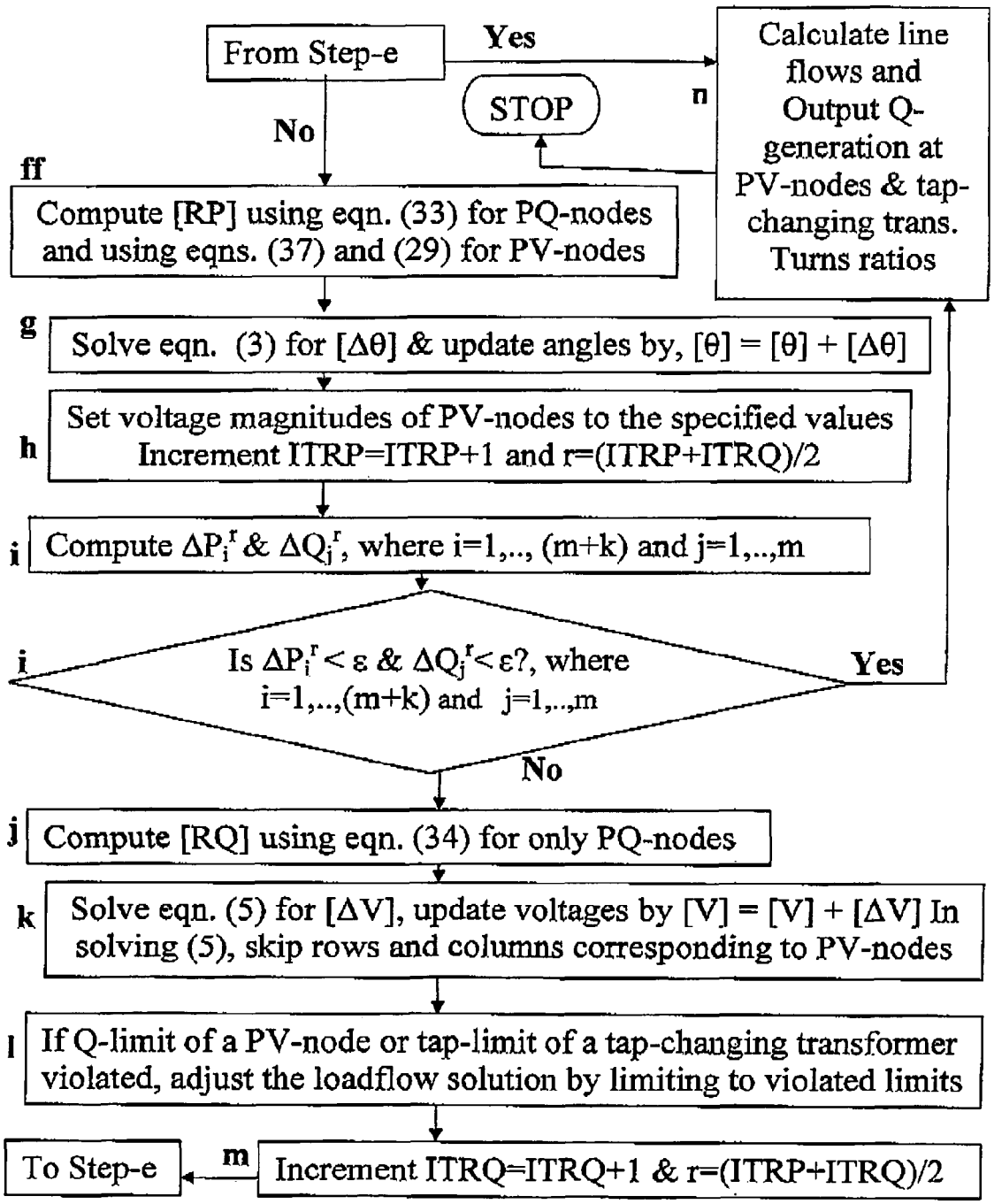
Fig.2: Invention: Flow-chart of Super Super Decoupled
(Cont.) Loadflow (SSDL-YY) method

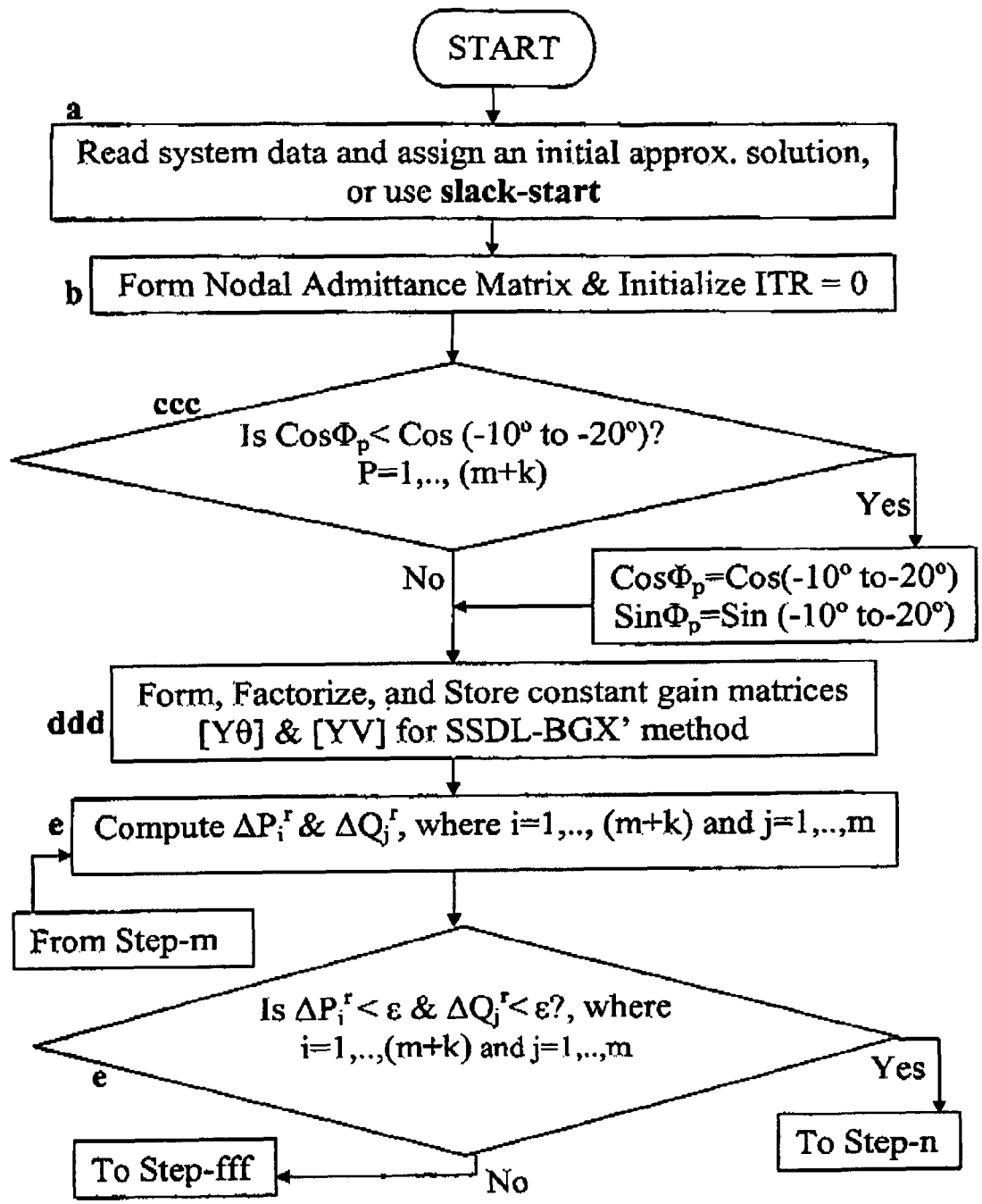
Fig.3:Invention: Flow-chart of Super Super Decoupled Loadflow (SSDL-BGX') method

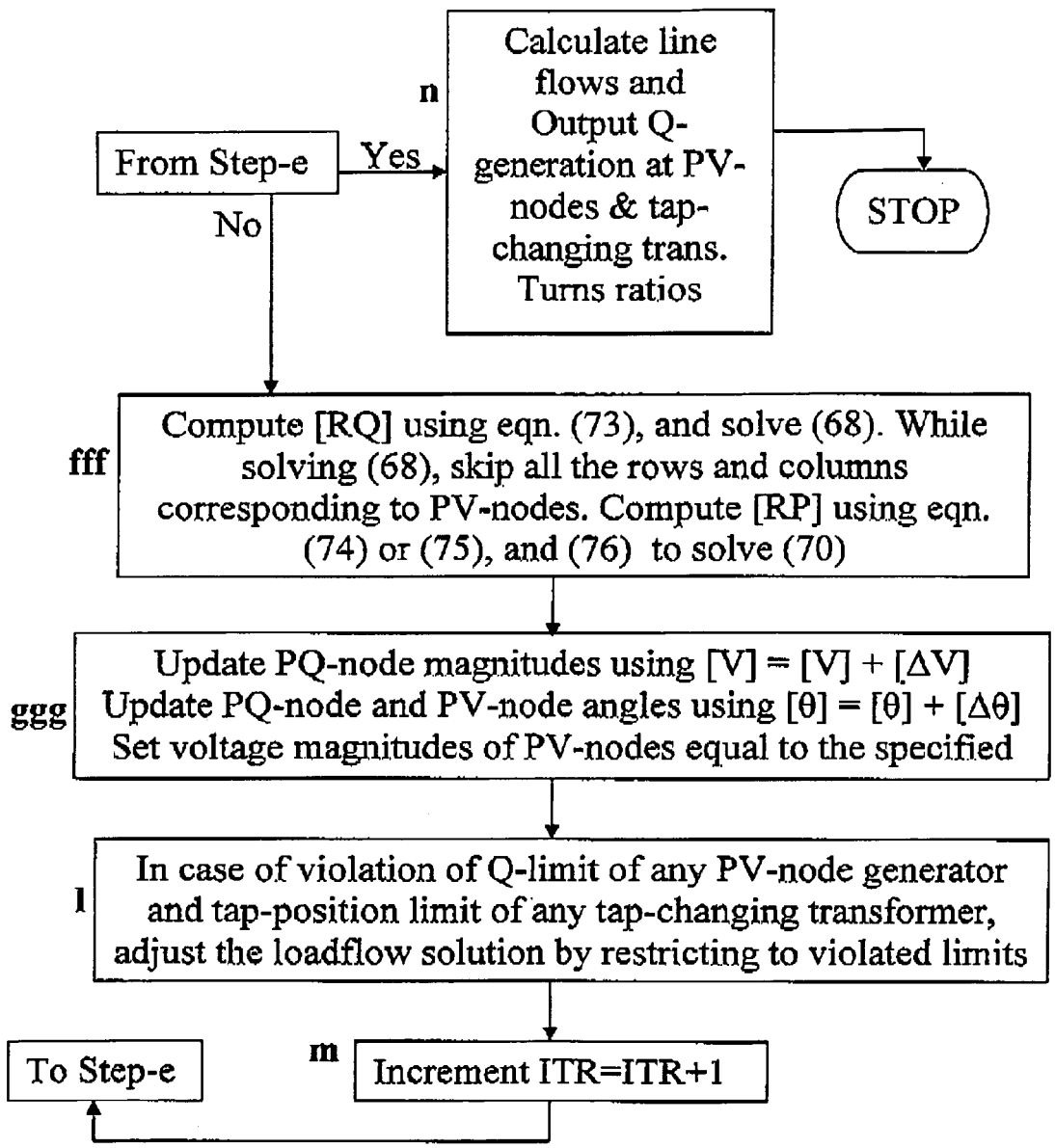
Fig.3: Invention: Flow-chart of Super Super Decoupled
(Cont.) Loadflow (SSDL-BGX') method

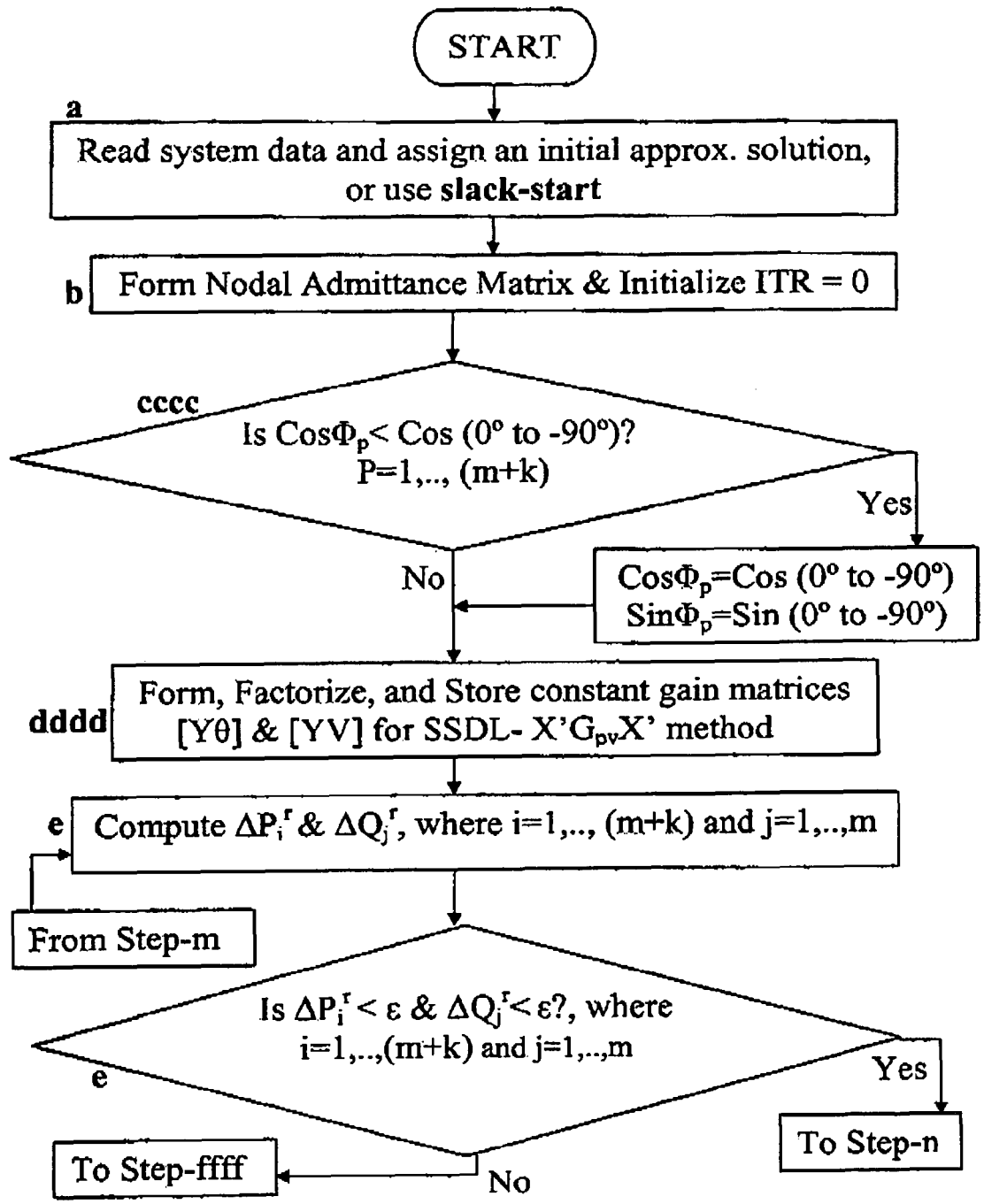
Fig.4: Invention: Flow-chart of Super Super Decoupled Loadflow (SSDL-X'$G_{pv}$X') method

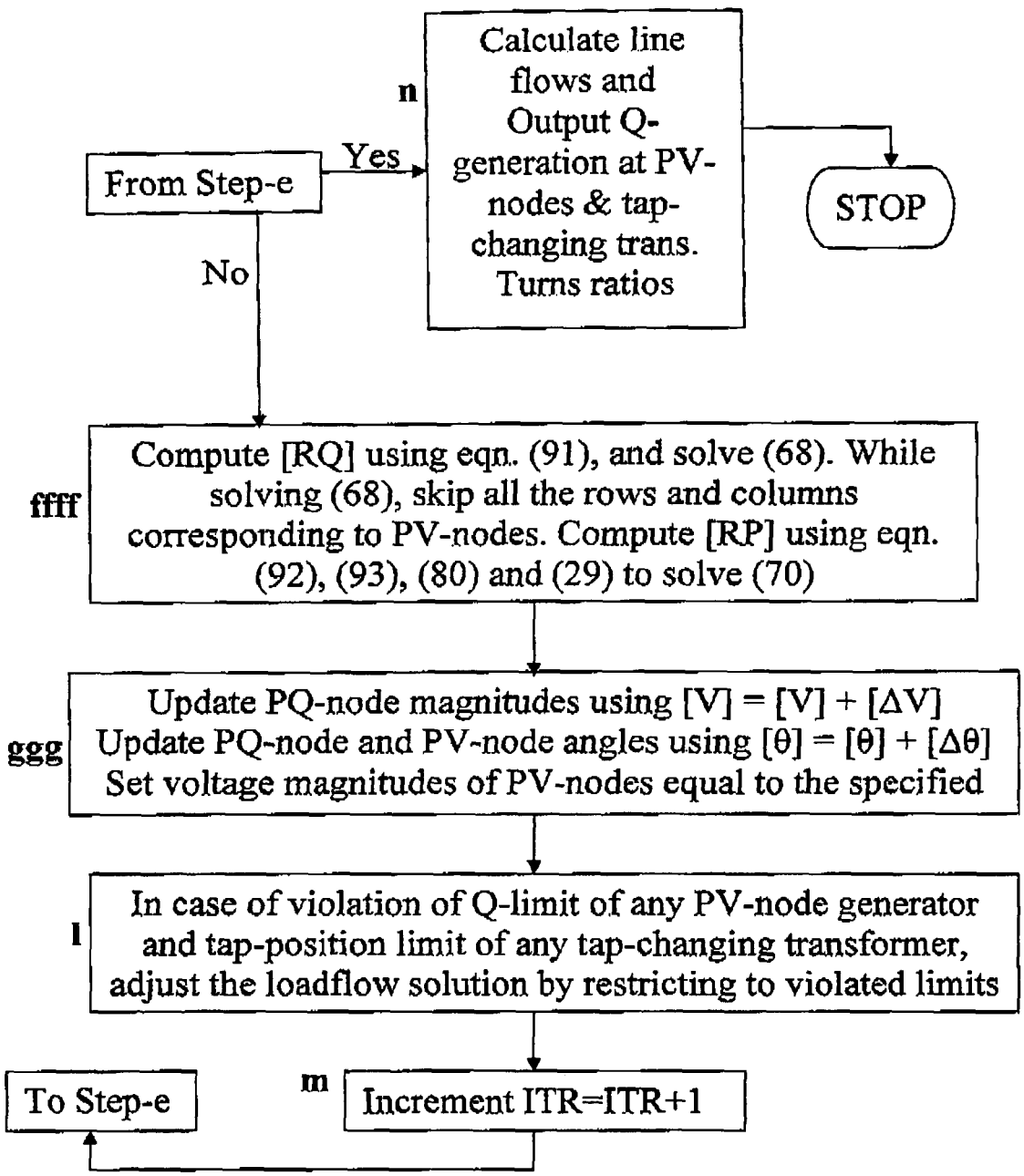
Fig.4: Invention: Flow-chart of Super Super Decoupled
(Cont.) Loadflow (SSDL-X'$G_{pv}$X') method

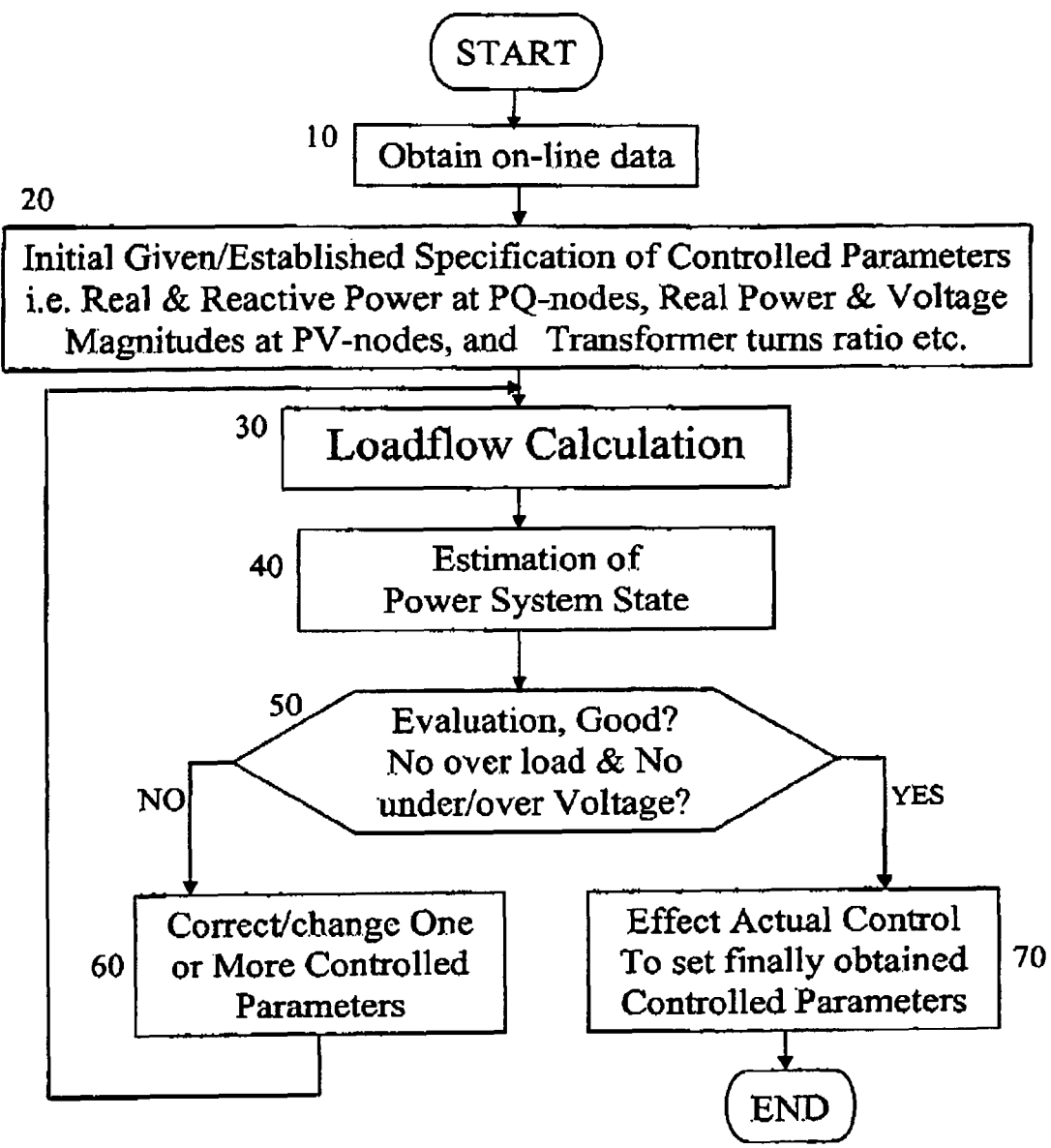
Fig.5: Loadflow Calculation in Power Flow Control and/or Voltage Control in Electrical Power System

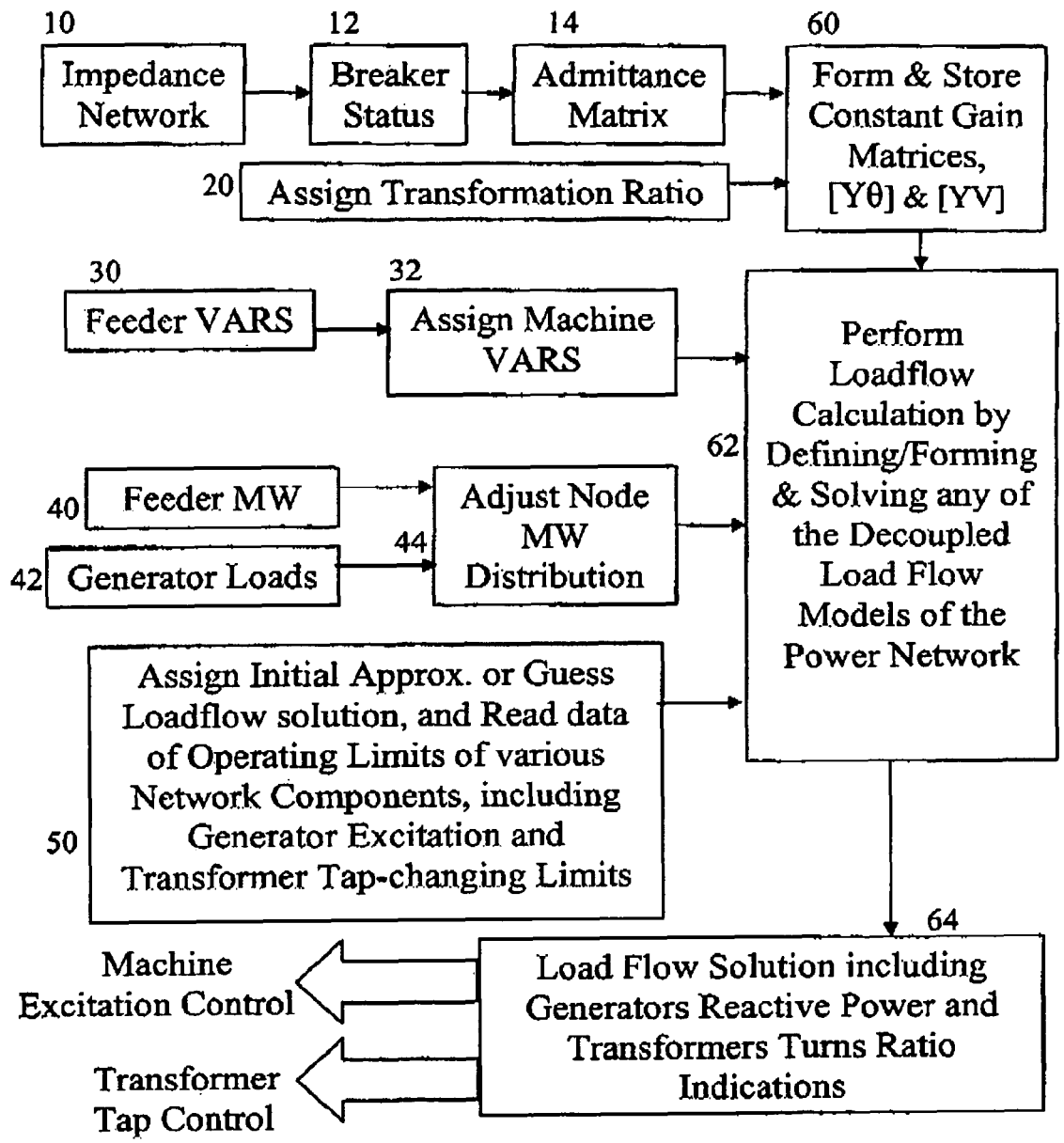
Fig. 6: Load-Flow Calculation for Voltage Control in Electrical Power System

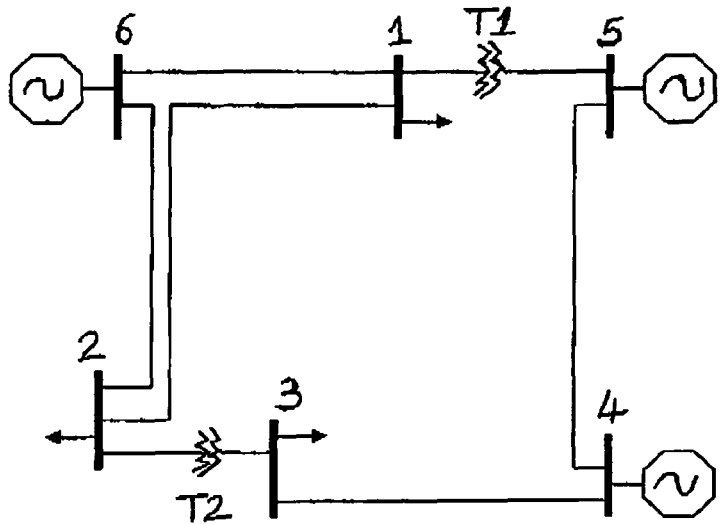
Fig. 7: An Exemplary 6-node Power System
      Nodes: 1, 2, 3 are PQ-nodes
      Nodes: 4 and 5 are PV-nodes
      Nodes: 6 is the slack/swing/reference node
      Transformers T1 and T2 are tap-changing

METHOD OF SUPER SUPER DECOUPLED LOADFLOW COMPUTATION FOR ELECTRICAL POWER SYSTEM

This application is the national phase under 35 USC 371 of PCT International Application No. PCT/CA03/001312 which has an International filing date of Aug. 29, 2003, which designated the United States of America, the entire contents of which are hereby incorporated by reference.

FIELD OF THE INVENTION

The present invention relates to a method of load flow calculation in power flow control and voltage control for an electrical power system.

BACKGROUND OF THE INVENTION

The present invention relates to power-flow/voltage control in utility/industrial power networks of the types including many power plants/generators interconnected through transmission/distribution lines to other loads and motors. Each of these components of the power network is protected against unhealthy or alternatively faulty, over/under voltage, and/or over loaded damaging operating conditions. Such a protection is automatic and operates without the consent of power network operator, and takes an unhealthy component out of service by disconnecting it from the network. The time domain of operation of the protection is of the order of milliseconds.

The purpose of a utility/industrial power network is to meet the electricity demands of its various consumers 24-hours a day, 7-days a week while maintaining the quality of electricity supply. The quality of electricity supply means the consumer demands be met at specified voltage and frequency levels without over loaded, under/over voltage operation of any of the power network components. The operation of a power network is different at different times due to changing consumer demands and development of any faulty/contingency situation. In other words healthy operating power network is constantly subjected to small and large disturbances. These disturbances could be consumer/operator initiated, or initiated by overload and under/over voltage alleviating functions collectively referred to as security control functions and various optimization functions such as economic operation and minimization of losses, or caused by a fault/contingency incident.

For example, a power network is operating healthy and meeting quality electricity needs of its consumers. A fault occurs on a line or a transformer or a generator which faulty component gets isolated from the rest of the healthy network by virtue of the automatic operation of its protection. Such a disturbance would cause a change in the pattern of power flows in the network, which can cause over loading of one or more of the other components and/or over/under voltage at one or more nodes in the rest of the network. This in turn can isolate one or more other components out of service by virtue of the operation of associated protection, which disturbance can trigger chain reaction disintegrating the power network.

Therefore, the most basic and integral part of all other functions including optimizations in power network operation and control is security control. Security control means controlling power flows so that no component of the network is over loaded and controlling voltages such that there is no over voltage or under voltage at any of the nodes in the network following a disturbance small or large. As is well known, controlling electric power flows include both controlling real power flows which is given in MWs, and controlling reactive power flows which is given in MVARs. Security control functions or alternatively overloads alleviation and over/under voltage alleviation functions can be realized through one or combination of more controls in the network. These involve control of power flow over tie line connecting other utility network, turbine steam/water/gas input control to control real power generated by each generator, load shedding function curtails load demands of consumers, excitation controls reactive power generated by individual generator which essentially controls generator terminal voltage, transformer taps control connected node voltage, switching in/out in capacitor/reactor banks controls reactive power at the connected node.

Control of an electrical power system involving power-flow control and voltage control commonly is performed according to a process shown in FIG. 5. The various steps entail the following.

Step-10: Obtain on-line/simulated readings of open/close status of all switches and circuit breakers, and read data of maximum and minimum reactive power generation capability limits of PV-node generators, maximum and minimum tap positions limits of tap changing transformers, and maximum power carrying capability limits of transmission lines, transformers in the power network, or alternatively read data of operating limits of power network components.

Step-20: Obtain on-line readings of real and reactive power assignments/schedules/specifications/settings at PQ-nodes, real power and voltage magnitude assignments/schedules/specifications/settings at PV-nodes and transformer turns ratios. These assigned/set values are controllable and are called controlled variables/parameters.

Step-30: Resulting voltage magnitudes and angles at power network nodes, power flows through various power network components, reactive power generations by generators and turns ratios of transformers in the power network are determined by performance of loadflow calculation, for the assigned/set/given/known values from step-20 or previous process cycle step-60, of controlled variables/parameters.

Step-40: The results of Loadflow calculation of step-30 are evaluated for any over loaded power network components like transmission lines and transformers, and over/under voltages at different nodes in the power system Step-50: If the system state is acceptable implying no over loaded transmission lines and transformers and no over/under voltages, the process branches to step-70, and if otherwise, then to step-60

Step-60: Changes the controlled variables/parameters set in step-20 or as later set by the previous process cycle step-60 and returns to step-30

Step-70: Actually implements the corrected controlled variables/parameters to obtain secure/correct/acceptable operation of power system Overload and under/over voltage alleviation functions produce changes in controlled variables/parameters in step-60 of FIG. 5. In other words controlled variables/parameters are assigned or changed to the new values in step-60. This correction in controlled variables/parameters could be even optimized in case of simulation of all possible imaginable disturbances including outage of a line and loss of generation for corrective action stored and made readily available for acting upon in case the simulated disturbance actually occurs in the power network. In fact simulation of all possible imaginable disturbances is the modern practice because corrective actions need be taken before the operation of individual protection of the power network components.

It is obvious that loadflow calculation consequently is performed many times in real-time operation and control environment and, therefore, efficient and high-speed loadflow calculation is necessary to provide corrective control in the changing power system conditions including an outage or failure of any of the power network components. Moreover, the loadflow calculation must be highly reliable to yield converged solution under a wide range of system operating conditions and network parameters. Failure to yield converged loadflow solution creates blind spot as to what exactly could be happening in the network leading to potentially damaging operational and control decisions/actions in capital-intensive power utilities.

The power system control process shown in FIG. 5 is very general and elaborate. It includes control of power-flows through network components and voltage control at network nodes. However, the control of voltage magnitude at connected nodes within reactive power generation capabilities of electrical machines including generators, synchronous motors, and capacitor/inductor banks, and within operating ranges of transformer taps is normally integral part of load flow calculation as described in "LTC Transformers and MVAR violations in the Fast Decoupled Load Flow, IEEE Trans., PAS-101, No. 9, PP. 3328-3332, September 1982." If under/over voltage still exists in the results of load flow calculation, other control actions, manual or automatic, may be taken in step-60 in the above and in FIG. 5. For example, under voltage can be alleviated by shedding some of the load connected.

The prior art and present invention are described using the following symbols and terms:

$Y_{pq} = G_{pq} + jB_{pq}$: (p-q)th element of nodal admittance matrix without shunts
$Y_{pp} = G_{pp} + jB_{pp}$: p-th diagonal element of nodal admittance matrix without shunts
$\bar{y}_p = g_p + jb_p$: total shunt admittance at any node-p
$\bar{V}_p = e_p + jf_p = V_p \angle \theta_p$: complex voltage of any node-p
$\Delta\theta_p, \Delta V_p$: voltage angle, magnitude corrections
$\Delta e_p, \Delta f_p$: real, imaginary components of voltage corrections
$P_p + jQ_p$: net nodal injected power calculated
$\Delta P_p + j\Delta Q_p$: nodal power residue or mismatch
$RP_p + jRQ_p$: modified nodal power residue or mismatch
$\Phi_p$: rotation or transformation angle
[RP]: vector of modified real power residue or mismatch
[RQ]: vector of modified reactive power residue or mismatch
[Yθ]: gain matrix of the P-θ loadflow sub-problem defined by eqn. (1)
[YV]: gain matrix of the Q-V loadflow sub-problem defined by eqn. (2)
m: number of PQ-nodes
k: number of PV-nodes
n=m+k+1: total number of nodes
q>p: q is the node adjacent to node-p excluding the case of q=p
[ ]: indicates enclosed variable symbol to be a vector or a matrix
LRA: Limiting Rotation Angle, −36° for prior art, −48° for invented models
PQ-node: load-node, where, Real-Power-P and Reactive-Power-Q are specified
PV-node: generator-node, where, Real-Power-P and Voltage-Magnitude-V are specified
$Y_{pq}' = G_{pq}' + jB_{pq}'$: rotated (p-q)th element of nodal admittance matrix without shunts
$Y_{pp}' = G_{pp}' + jB_{pp}'$: rotated p-th diagonal element of nodal admittance matrix without shunts
$\Delta P_p' = \Delta P_p \cos \Phi_p + \Delta Q_p \sin \Phi_p$: rotated or transformed real power mismatch
$\Delta Q_p' = \Delta Q_p \cos \Phi_p - \Delta P_p \sin \Phi_p$: rotated or transformed reactive power mismatch Loadflow Calculation: Each node in a power network is associated with four electrical quantities, which are voltage magnitude, voltage angle, real power, and reactive power. The loadflow calculation involves calculation/determination of two unknown electrical quantities for other two given/specified/scheduled/set/known electrical quantities for each node. In other words the loadflow calculation involves determination of unknown quantities in dependence on the given/specified/scheduled/set/known electrical quantities.

Loadflow Model: a set of equations describing the physical power network and its operation for the purpose of loadflow calculation. The term 'loadflow model' can be alternatively referred to as 'model of the power network for loadflow calculation'. The process of writing Mathematical equations that describe physical power network and its operation is called Mathematical Modeling. If the equations do not describe/represent the power network and its operation accurately the model is inaccurate, and the iterative loadflow calculation method could be slow and unreliable in yielding converged loadflow calculation. There could be variety of Loadflow Models depending on organization of set of equations describing the physical power network and its operation, including Decoupled Loadflow Models, Super Decoupled Loadflow Models, Fast Super Decoupled Loadflow (FSDL) Model, and Super Super Decoupled Loadflow (SSDL) Model.

Loadflow Method: sequence of steps used to solve a set of equations describing the physical power network and its operation for the purpose of loadflow calculation is called Loadflow Method, which term can alternatively be referred to as 'loadflow calculation method' or 'method of loadflow calculation'. One word for a set of equations describing the physical power network and its operation is: Model. In other words, sequence of steps used to solve a Loadflow Model is a Loadflow Method. The loadflow method involves definition/formation of a loadflow model and its solution. There could be variety of Loadflow Methods depending on a loadflow model and iterative scheme used to solve the model including Decoupled Loadflow Methods, Super Decoupled Loadflow Methods, Fast Super Decoupled Loadflow (FSDL) Method, and Super Super Decoupled Loadflow (SSDL) Method. All decoupled loadflow methods described in this application use either successive (1θ, 1V) iteration scheme or simultaneous (1V, 1θ) iteration scheme, defined in the following.

Prior art method of loadflow calculation of the kind carried out as step-30 in FIG. 5, include a class of methods known as decoupled loadflow. This class of methods consists of decoupled loadflow and super decoupled loadflow methods including Fast Super Decoupled Loadflow method. However, functional forms of different elements of the prior art Super Decoupled Loadflow Fast Super Decoupled Loadflow (FSDL) model defined by system of equations (1) and (2) will be given below before description of steps of the prior art loadflow calculation method. The prior art FSDL model is very sensitive, in terms of iterations required to achieve converged loadflow calculation, to the restricted value of the rotation angle applied to complex power mismatch in terms of mismatch in real and reactive power flowing in through each of PQ-nodes. Moreover, the presence of twice the value of transformed network shunt in a diagonal element of the gain matrix [YV] for certain power network causes slow convergence taking increased number of iterations to converge to a solution, and therefore required increased calculation time.

The aforesaid class of Decoupled Loadflow models involves a system of equations for the separate calculation of voltage angle and voltage magnitude corrections. Each decoupled model comprises a system of equations (1) and (2) differing in the definition of elements of [RP], [RQ], [Yθ] and [YV].

$$[RP]=[Y\theta][\Delta\theta] \quad (1)$$

$$[RQ]=[YV][\Delta V] \quad (2)$$

A decoupled loadflow calculation method involves solution of a decoupled loadflow model comprising system of equations (1) and (2) in an iterative manner. Commonly, successive (1θ, 1V) iteration scheme is used for solving system of equations (1) and (2) alternately with intermediate updating. Each iteration involves one calculation of [RP] and [Δθ] to update [θ] and then one calculation of [RQ] and [ΔV] to update [V]. The sequence of equations (3) to (6) depicts the scheme.

$$[\Delta\theta]=[Y\theta]^{-1}[RP] \quad (3)$$

$$[\theta]=[\theta]+[\Delta\theta] \quad (4)$$

$$[\Delta V]=[YV]^{-1}[RQ] \quad (5)$$

$$[V]=[V]+[\Delta V] \quad (6)$$

The elements of [RP] and [RQ] for PQ-nodes are given by equations (7) to (10).

$$RP_p = (\Delta P_p \cos \Phi_p + \Delta Q_p \sin \Phi_p)V_p = \Delta P_p'/V_p \quad (7)$$

$$RQ_p = (-\Delta P_p \sin \Phi_p + \Delta Q_p \cos \Phi_p)/V_p = \Delta Q_p'/V_p \quad (8)$$

$$\cos \Phi_p = \text{Absolute}(B_{pp}/\sqrt{(G_{pp}^2+B_{pp}^2)}) \geq \cos(-36°) \quad (9)$$

$$\sin \Phi_p = -\text{Absolute}(G_{pp}/\sqrt{(G_{pp}^2+B_{pp}^2)}) \geq \sin(-36°) \quad (10)$$

A description of Super Decoupling principle and the prior art FSDL model is given in, "Fast Super Decoupled Loadflow", IEE proceedings Part-C, Vol. 139, No. 1, pp. 13-20, January 1992.

Fast Super Decoupled Loadflow (FSDL) model consists of equations (3) to (16).

$$RP_p = \Delta P_p/(K_p V_p) \quad (11)$$

$$b_p' = b_p \cos \Phi_p \text{ or } b_p' = b_p \quad (15)$$

$$K_p = \text{Absolute}(B_{pp}/Y\theta_{pp}) \quad (16)$$

Branch admittance magnitude in (12) and (13) is of the same algebraic sign as its susceptance. Elements of the two gain matrices differ in that diagonal elements of [YV] additionally contain the b' values given by equation (15) and in respect of elements corresponding to branches connected between two PV-nodes or a PV-node and the slack-node. In two simple variations of the FSDL model, one is to make $YV_{pq}=Y\theta_{pq}$ and the other is to make $Y\theta_{pq}=YV_{pq}$.

The steps of loadflow calculation method FSDL are shown in the flowchart of FIG. 1. Referring to the flowchart of FIG. 1, different steps are elaborated in steps marked with similar letters in the following. The words "Read system data" in Step-a correspond to step-10 and step-20 in FIG. 5, and step-14, step-20, step-32, step-44, step-50 in FIG. 6. All other steps in the following correspond to step-30 in FIG. 5, and step-60, step-62, and step-64 in FIG. 6.

a. Read system data and assign an initial approximate solution. If better solution estimate is not available, set all the nodes voltage magnitudes and angles equal to those of the slack-node. This is referred to as the slack-start.

b. Form nodal admittance matrix, and Initialize iteration count ITRP=ITRQ=r=0.

c. Compute sine and cosine of rotation angles using equations (9) and (10), and store them. If Cos $\Phi_p$<Cos(−36°), set Cos $\Phi_p$=Cos(−36°) and Sin $\Phi_p$=Sin(−36°).

d. Form (m+k)×(m+k) size gain matrices [Yθ] and [YV] of (1) and (2) respectively each in a compact storage exploiting sparsity, using equations (12) to (15). In [YV] matrix, replace diagonal elements corresponding to PV-nodes by very large value, say, $10.0^{10}$. Factorize [Yθ] and [YV] using the same ordering of nodes regardless of node-types and store them using the same indexing and addressing information.

e. Compute residues [ΔP] at PQ- and PV-nodes and [ΔQ] at only PQ-nodes. If all are less than the tolerance (ε), proceed to step-m. Otherwise follow the next step.

f. Compute the vector of modified residues [RP] using (7) for PQ-nodes, and using (11) and (16) for PV-nodes.

g. Solve (3) for [Δθ] and update voltage angles using, [θ]= [θ]+[Δθ].

h. Set voltage magnitudes of PV-nodes equal to the specified values, and Increment the iteration count ITRP=ITRP+1 and r=(ITRP+ITRQ)/2.

i. Compute residues [ΔP] at PQ- and PV-nodes and [ΔQ] at PQ-nodes only. If all are less than the tolerance (ε), proceed to step-m. Otherwise follow the next step.

$$Y\theta_{pq} = \begin{cases} -Y_{pq} & \text{-for branch } r/x \text{ ratio} \leq 2.0 \\ -(B_{pq}+0.9(Y_{pq}-B_{pq})) & \text{-for branch } r/x \text{ ratio} > 2.0 \\ -B_{pq} & \text{-for branches connected between two } PV\text{-nodes} \\ & \text{or a } PV\text{-node and the slack-node} \end{cases} \quad (12)$$

$$YV_{pq} = \begin{cases} -Y_{pq} & \text{-for branch } r/x \text{ ratio} \leq 2.0 \\ -(B_{pq}+0.9(Y_{pq}-B_{pq})) & \text{-for branch } r/x \text{ ratio} > 2.0 \end{cases} \quad (13)$$

$$Y\theta_{pp} = \sum_{q>p} -Y\theta_{pq} \quad \text{and} \quad YV_{pp} = -2b_p' + \sum_{q>p} -YV_{pq} \quad (14)$$

j. Compute the vector of modified residues [RQ] using (8) for only PQ-nodes.
k. Solve (5) for [ΔV] and update PQ-node magnitudes using [V]=[V]+[ΔV]. While solving equation (5), skip all the rows and columns corresponding to PV-nodes.
l. Calculate reactive power generation at PV-nodes and tap positions of tap-changing transformers. If the maximum and minimum reactive power generation capability and transformer tap position limits are violated, implement the violated physical limits and adjust the loadflow solution by the method described in "LTC Transformers and MVAR violations in the Fast Decoupled Load Flow, IEEE Trans., PAS-101, No. 9, PP. 3328-3332, September 1982".
m. Increment the iteration count ITRQ=ITRQ+1 and r=(ITRP+ITRQ)/2, and Proceed to step-d.
n. From calculated values of voltage magnitude and voltage angle at PQ-nodes, voltage angle and reactive power generation at PV-nodes, and tap position of tap changing transformers, calculate power flows through power network components.

In super decoupled loadflow models [Yθ] and [YV] are real, sparse, symmetrical and built only from network elements. Since they are constant, they need to be factorized once only at the start of the solution. Equations (1) and (2) are to be solved repeatedly by forward and backward substitutions. [Yθ] and [YV] are of the same dimensions (m+k)×(m+k) when only a row/column of the slack-node or reference-node is excluded and both are triangularized using the same ordering regardless of the node-types. For a row/column corresponding to a PV-node excluded in [YV], use a large diagonal to mask out the effects of the off-diagonal terms. When the PV-node is switched to the PQ-type, removing the large diagonal reactivates the row/column corresponding to a switched PV-node to PQ-node type. This technique is especially useful in the treatment of PV-nodes in the gain matrix [YV].

The convergence of the prior art FSDL method is very sensitive to the value of the restriction applied to the rotation angle. The best possible convergence from non-linearity consideration could be achieved by restricting rotation angle to maximum of −36. However, when large Resistance (R)/Reactance (X) ratio branch is present in the network without creating non-linearity problem, it takes large number of iterations to converge. Moreover, the presence of twice the transformed value of network shunts in the diagonal elements of the gain matrix [YV], causes it to take increased number of iterations in case of certain power networks. These problems are overcome by formulating power flow equations such that transformed values of known/given/specified/scheduled/set quantities appears in the diagonal elements of the gain matrix [YV] as described in the following.

SUMMARY OF THE INVENTION

It is a primary object of the present invention to improve convergence and efficiency of the prior art Fast Super Decoupled Loadflow calculation method under wide range of system operating conditions and network parameters for use in power flow control and voltage control in the power system. A further object of the invention is to reduce computer storage/memory or calculating volume requirements.

The above and other objects are achieved, according to the present invention, with any one system of Super Super Decoupled Loadflow, X'X'-version (SSDL-X'X') and its many manifestations, calculation for Electrical Power System. In context of voltage control, the inventive system of SSDL calculation for Electrical Power system consisting of plurality of electromechanical rotating machines, transformers and electrical loads connected in a network, each machine having a reactive power characteristic and an excitation element which is controllable for adjusting the reactive power generated or absorbed by the machine, and some of the transformers each having a tap changing element, which is controllable for adjusting turns ratio or alternatively terminal voltage of the transformer, said system comprising:

means defining and solving loadflow model of the power network characterized by inventive SSDL model for providing an indication of the quantity of reactive power to be supplied by each generator including the slack/reference node generator, and for providing an indication of turns ratio of each tap-changing transformer in dependence on the obtained-online or given/specified/set/known controlled network variables/parameters, and physical limits of operation of the network components, machine control means connected to the said means defining and solving loadflow model and to the excitation elements of the rotating machines for controlling the operation of the excitation elements of machines to produce or absorb the amount of reactive power indicated by said means defining and solving loadflow model in dependence on the set of obtained-online or given/specified/set controlled network variables/parameters, and physical limits of excitation elements, transformer tap position control means connected to the said means defining and solving loadflow model and to the tap changing elements of the controllable transformers for controlling the operation of the tap changing elements to adjust the turns ratios of transformers indicated by the said means defining and solving loadflow model in dependence on the set of obtained-online or given/specified/set controlled network variables/parameters, and operating limits of the tap-changing elements.

The method and system of voltage control according to the preferred embodiment of the present invention provide voltage control for the nodes connected to PV-node generators and tap changing transformers for a network in which real power assignments have already been fixed. The said voltage control is realized by controlling reactive power generation and transformer tap positions.

The inventive system of Super Super Decoupled Loadflow (SSDL) calculation can be used to solve a model of the Electrical Power System for voltage control. For this purpose real and reactive power assignments or settings at PQ-nodes, real power and voltage magnitude assignments or settings at PV-nodes and transformer turns ratios, open/close status of all circuit breaker, the reactive capability characteristic or curve for each machine, maximum and minimum tap positions limits of tap changing transformers, operating limits of all other network components, and the impedance or admittance of all lines are supplied. A decoupled loadflow system of equations (1) and (2) is solved by an iterative process until convergence. During this solution the quantities which can vary are the real and reactive power at the reference/slack node, the reactive power set points for each PV-node generator, the transformer transformation ratios, and voltages on all PQ-nodes nodes, all being held within the specified ranges. When the iterative process converges to a solution, indications of reactive power generation at PV-nodes and transformer turns-ratios or tap-settings are provided. Based on the known reactive power capability characteristics of each PV-node generator, the determined reactive power values are used to adjust the excitation current to each generator to establish the reactive power set points. The transformer taps are set in accordance with the turns ratio indication provided by the system of loadflow calculation.

For voltage control, system of SSDL calculation can be employed either on-line or off-line. In off-line operation, the user can simulate and experiment with various sets of operating conditions and determine reactive power generation and transformer tap settings requirements. A general-purpose computer can implement the entire system. For on-line operation, the load flow calculation system is provided with data identifying the current real and reactive power assignments and transformer transformation ratios, the present status of all switches and circuit breakers in the network and machine characteristic curves in steps-10 and -20 in FIG. 5, and steps 12, 20, 32, 44, and 50 in FIG. 6 described below. Based on this information, a model of the system based on gain matrices of invented load flow calculation systems provide the values for the corresponding node voltages, reactive power set points for each machine and the transformation ratio and tap changer position for each transformer.

The present inventive system of loadflow calculation for Electrical Power System consists of, a Super Super Decoupled Loadflow: X'X'-version (SSDL-X'X') method characterized in that 1) modified real power mismatch at any PQ-node-p is calculated as $RP_p = [\Delta P_p' + (G_{pp}'/B_{pp}')\Delta Q_p']/V_p^2$, which takes different form for different manifestation of the SSDL-X'X' method, 2) the presence of transformed values of known/given/specified/scheduled/set quantities in the diagonal elements of the gain matrix [YV] of the Q-V sub-problem, and 3) transformation angles are restricted to maximum of −48°, and these inventive loadflow calculation steps together yield some processing acceleration and consequent efficiency gains, and are each individually inventive, and 4) except in the manifestation SSDL-BX, modified real power mismatches at PV-nodes are determined as $RP_p = \Delta P_p/(K_p V_p)$ in order to keep gain matrix [Yθ] symmetrical. If the value of factor $K_p = 1$, the gain matrix [Yθ] becomes unsymmetrical in that elements in the rows corresponding to PV-nodes are defined without transformation or rotation applied, as $Y\theta_{pq} = -B_{pq}$.

An alternate inventive system of loadflow calculation for Electrical Power System consists of, a Super Super Decoupled Loadflow: BGX'-version (SSDL-BGX') method, using simultaneous (1V, 1θ) iteration scheme, characterized in that 1) the modified real power mismatch at any PV-node-p is calculated as:

$$RP_p = \left[(\Delta P_p/V_p) - \sum_{q=1}^{m} G_{pq}\Delta V_q\right]/V_p \quad (74)$$

and 2) the modified real power mismatch at any PQ-node-p is calculated as:

$$RP_p = \left[(\Delta P_p/V_p) - \sum_{q=1}^{m} G_{pq}\Delta V_q - (g_p'\Delta V_p)\right]/V_p \text{ or} \quad (75)$$

$$RP_p = \left[(\Delta P_p/V_p) - \sum_{q=1}^{m} G_{pq}\Delta V_q\right]/V_p \quad (76)$$

A further alternate inventive system of loadflow calculation for Electrical Power System consists of, a Super Super Decoupled Loadflow:X'G$_{pv}$X'-version (SSDL-X'G$_{pv}$X') method, using simultaneous (1V, 1θ) iteration scheme, characterized in that 1) the modified real power mismatch at any PV-node-p is calculated as:

$$RP_p = \left[(\Delta P_p/V_p) - \sum_{q=1}^{m} G_{pq}\Delta V_q\right]/(K_q * V_q) \quad (93)$$

and, 2) the modified real power mismatch at any PQ-node-p is calculated as:

$$RP_p = [\{[\Delta P_p' + (G_{pp}'/B_{pp}')\Delta Q_p']/V_p\} - (g_p'\Delta V_p)]/V_p \quad (92)$$

It is also disclosed that all the above loadflow calculating systems 1) use the slack-start as the initial guess solution for increased processing acceleration, 2) skip from calculation, all the rows and columns corresponding to PV-nodes in factorized gain matrix [YV] while solving for [ΔV] in Q-V sub-problem, leading to some more processing acceleration, and 3) use the same indexing and addressing information for forming and storing both the constant gain matrices [Yθ], and [YV] factorized using the same ordering regardless of node types leading to about 35% saving in computer storage/memory or alternatively calculating volume requirements. The SSDL-YY model is the simplest, easiest to implement and overall best in performance in terms of efficiency of calculations, reliability of convergence, and least computer memory requirements among all described in the following, and their simple variants with almost similar performance.

BRIEF DESCRIPTION OF DRAWINGS

FIG. 1 is a flow-chart of prior art FSDL method

FIG. 2 is a flow-chart embodiment of the invented Super Super Decoupled Loadflow (SSDL-YY) calculation method FIG. 3 is a flow-chart embodiment of the invented Super Super Decoupled Loadflow (SSDL-BGX', SSDL-BGY, and SSDL-BGX) calculation methods FIG. 4 is a flow-chart embodiment of the invented Super Super Decoupled Loadflow (SSDL-X'G$_{pv}$X') calculation method FIG. 5 is a flow-chart of the overall controlling method for an electrical power system involving loadflow calculation as a step which can be executed using one of the loadflow calculation methods embodied in FIG. 1, 2, 3 or 4

FIG. 6 is a flow-chart of the simple special case of voltage control system in overall controlling system of FIG. 5 for an electrical power system FIG. 7 is a one-line diagram of an exemplary 6-node power network having a slack/swing/reference node, two PV-nodes, and three PQ-nodes

DESCRIPTION OF A PREFERRED EMBODIMENT

A loadflow calculation is involved as a step in power flow control and/or voltage control in accordance with FIG. 5 or FIG. 6. A preferred embodiment of the present invention is described with reference to FIG. 7 as directed to achieving voltage control.

FIG. 7 is a simplified one-line diagram of an exemplary utility power network to which the present invention may be applied. The fundamentals of one-line diagrams are described in section 6.11 of the text ELEMENTS OF POWER SYSTEM ANALYSIS, forth edition, by William D. Stevenson, Jr., McGraw-Hill Company, 1982. In FIG. 7, each thick vertical line is a network node. The nodes are interconnected in a desired manner by transmission lines and transformers each having its impedance, which appears in the loadflow models. Two transformers in FIG. 7 are equipped with tap changers to control their turns ratios in order to control terminal voltage of node-1 and node-2 where large loads are connected.

Node-6 is a reference-node alternatively referred to as the slack or swing-node, representing the biggest power plant in a power network. Nodes-4 and -5 are PV-nodes where generators are connected, and nodes-1, -2, and -3 are PQ-nodes where loads are connected. It should be noted that the nodes-4, -5, and -6 each represents a power plant that contains many generators in parallel operation. The single generator symbol at each of the nodes-4, -5, and -6 is equivalent of all generators in each plant. The power network further includes controllable circuit breakers located at each end of the transmission lines and transformers, and depicted by cross markings in one-line diagram of FIG. 7. The circuit breakers can be operated or in other words opened or closed manually by the power system operator or relevant circuit breakers operate automatically consequent of unhealthy or faulty operating conditions. The operation of one or more circuit breakers modify the configuration of the network. The arrows extending certain nodes represent loads.

A goal of the present invention is to provide a reliable and computationally efficient loadflow calculation that appears as a step in power flow control and/or voltage control systems of FIG. 5 and FIG. 6. However, the preferred embodiment of loadflow calculation as a step in control of terminal node voltages of PV-node generators and tap-changing transformers is illustrated in the flow diagram of FIG. 6 in which present invention resides in function steps 60 and 62.

Short description of other possible embodiment of the present invention is also provided herein. The present invention relates to control of utility/industrial power networks of the types including plurality of power plants/generators and one or more motors/loads, and connected to other external utility. In the utility/industrial systems of this type, it is the usual practice to adjust the real and reactive power produced by each generator and each of the other sources including synchronous condensers and capacitor/inductor banks, in order to optimize the real and reactive power generation assignments of the system. Healthy or secure operation of the network can be shifted to optimized operation through corrective control produced by optimization functions without violation of security constraints. This is referred to as security constrained optimization of operation. Such an optimization is described in the U.S. Pat. No. 5,081,591 dated Jan. 13, 1992: "Optimizing Reactive Power Distribution in an Industrial Power Network", where the present invention can be embodied by replacing the step nos. 56 and 66 each by a step of constant gain matrices [Yθ] and [YV], and replacing steps of "Exercise Newton-Raphson Algorithm" by steps of "Exercise Super Super Decoupled Loadflow Calculation" in places of steps 58 and 68. This is just to indicate the possible embodiment of the present invention in optimization functions like in many others including state estimation function. However, invention is being claimed through a simplified embodiment without optimization function as in FIG. 6 in this application. The inventive steps-60 and -62 in FIG. 6 are different than those corresponding steps-56, and -58, which constitute a well known Newton-Raphson loadflow method, and were not inventive even in U.S. Pat. No. 5,081,591.

In FIG. 6, function step 10 provides stored impedance values of each network component in the system. This data is modified in a function step 12, which contains stored information about the open or close status of each circuit breaker. For each breaker that is open, the function step 12 assigns very high impedance to the associated line or transformer. The resulting data is than employed in a function step 14 to establish an admittance matrix for the power network. The data provided by function step 10 can be input by the computer operator from calculations based on measured values of impedance of each line and transformer, or on the basis of impedance measurements after the power network has been assembled.

Each of the transformers T1 and T2 in FIG. 7 is a tap changing transformer having a plurality of tap positions each representing a given transformation ratio. An indication of initially assigned transformation ratio for each transformer is provided by function step 20.

The indications provided by function steps 14, and 20 are supplied to a function step 60 in which constant gain matrices [Yθ] and [YV] of any of the invented super decoupled loadflow models are constructed, factorized and stored. The gain matrices [Yθ] and [YV] are conventional tools employed for solving Super Decoupled Loadflow model defined by equations (1) and (2) for a power system.

Indications of initial reactive power, or Q on each node, based on initial calculations or measurements, are provided by a function step 30 and these indications are used in function step 32, to assign a Q level to each generator and motor. Initially, the Q assigned to each machine can be the same as the indicated Q value for the node to which that machine is connected.

An indication of measured real power, P, on each node is supplied by function step 40. Indications of assigned/specified/scheduled/set generating plant loads that are constituted by known program are provided by function step 42, which assigns the real power, P, load for each generating plant on the basis of the total P which must be generated within the power system. The value of P assigned to each power plant represents an economic optimum, and these values represent fixed constraints on the variations, which can be made by the system according to the present invention. The indications provided by function steps 40 and 42 are supplied to function step 44 which adjusts the P distribution on the various plant nodes accordingly. Function step 50 assigns initial approximate or guess solution to begin iterative method of loadflow calculation, and reads data file of operating limits on power network components, such as maximum and minimum reactive power generation capability limits of PV-nodes generators.

The indications provided by function steps 32, 44, 50 and 60 are supplied to function step 62 where inventive Fast Super Decoupled Loadflow calculation or Novel Fast Super Decoupled Loadflow calculation is carried out, the results of which appear in function step 64. The loadflow calculation yields voltage magnitudes and voltage angles at PQ-nodes, real and reactive power generation by the slack/swing/reference node generator, voltage angles and reactive power generation indications at PV-nodes, and transformer turns ratio or tap position indications for tap changing transformers. The system stores in step 62 a representation of the reactive capability characteristic of each PV-node generator and these characteristics act as constraints on the reactive power that can be calculated for each PV-node generator for indication in step 64. The indications provided in step 64 actuate machine excitation control and transformer tap position control. All the loadflow calculation methods using SSDL models can be used to effect efficient and reliable voltage control in power systems as in the process flow diagram of FIG. 6.

Particular inventive loadflow calculation steps of all the SSDL methods are described followed by inventive SSDL models in terms of equations for determining elements of vectors [RP], [RQ], and elements of gain matrices [Yθ], and [YV] of equations (1) and (2), further followed by detailed steps of inventive loadflow calculation methods. Also, calculation accelerating and storage reducing techniques are described, which are not inventive.

The presence of transformed values of known/given/specified/scheduled/set quantities in the diagonal elements of the gain matrix [YV] of the Q-V sub-problem in equation (22), which takes different form for different manifestation of the SSDL-X'X' method, is brought about by such formulation of loadflow equations. The said transformed quantities in the diagonal elements of the gain matrix [YV] improved convergence and the reliability of obtaining converged loadflow calculation, when modified real power mismatch at any PQ-node-p is calculated as $RP_p = [\Delta P_p' + (G_{pp}'/B_{pp}')\Delta Q_p']/V_p^2$, which takes different form for different manifestation of the SSDL-X'X' method.

Rotation or transformation angle restriction to maximum of −48° in case of invented loadflow models for use in equations (35) and (36) or (27) and (28) is arrived at experimentally. The factor 0.9 in equations (38), and (39) is also determined experimentally. These said values of rotation angle −48° and the factor 0.9 are determined experimentally such that best possible convergence of loadflow calculation is obtained under wide range of network parameters and operating condition.

An alternate inventive system of loadflow calculation for Electrical Power System consists of, a Super Super Decoupled Loadflow: BGX'-version (SSDL-BGX') method, using simultaneous (1V, 1θ) iteration scheme, characterized in that 1) the modified real power mismatch at any PV-node-p is calculated as:

$$RP_p = \left[(\Delta P_p/V_p) - \sum_{q=1}^{m} G_{pq}\Delta V_q\right]/V_p \quad (74)$$

and 2) the modified real power mismatch at any PQ-node-p is calculated as:

$$RP_p = \left[(\Delta P_p/V_p) - \sum_{q=1}^{m} G_{pq}\Delta V_q - (g_p'\Delta V_p)\right]/V_p \text{ or} \quad (75)$$

$$RP_p = \left[(\Delta P_p/V_p) - \sum_{q=1}^{m} G_{pq}\Delta V_q\right]/V_p \quad (76)$$

A further alternate inventive system of loadflow calculation for Electrical Power System consists of, a Super Super Decoupled Loadflow:X'$G_{pv}$X'-version (SSDL-X'$G_{pv}$X') method, using simultaneous (1V, 1θ) iteration scheme, characterized in that 1) the modified real power mismatch at any PV-node-p is calculated as:

$$RP_p = \left[(\Delta P_p/V_p) - \sum_{q=1}^{m} G_{pq}\Delta V_q\right]/(K_p * V_p) \quad (93)$$

and, 2) the modified real power mismatch at any PQ-node-p is calculated as:

$$RP_p = [\{[\Delta P_p' + (G_{pp}'/B_{pp}')\Delta Q_p']/V_p\} - (g_p'\Delta V_p)]/V_p \quad (92)$$

The slack-start is to use the same voltage magnitude and angle as those of the slack/swing/reference node as the initial guess solution estimate for initiating the iterative loadflow calculation. With the specified/scheduled/set voltage magnitudes, PV-node voltage magnitudes are adjusted to their known values after the first P-θ iteration. This slack-start saves almost all effort of mismatch calculation in the first P-θ iteration. It requires only shunt flows from each node to ground to be calculated at each node, because no flows occurs from one node to another because they are at the same voltage magnitude and angle.

The same indexing and addressing information can be used for the storage of both the gain matrices [Yθ] and [YV] as they are of the same dimension and sparsity structure as explained herein. This is achieved for all the inventive SSDL models. Voltage magnitude is specified/scheduled/set for PV-nodes where generators are connected, which each maintains/controls specified voltage magnitude at its node by changing its reactive power generation. Therefore, corrections in voltage magnitudes at PV-nodes are not required to be calculated as they do not change, and Q-V subproblem of equation (2) need to be solved only for PQ-nodes voltage corrections. However, matrix [YV] is formed of dimension (m+k)×(m+k) including PV-nodes, and large diagonal value say, $10.0^{10}$ is used for diagonal elements corresponding to PV-nodes to mask out the effect of off diagonal terms in the factorization process that normalizes the elements of a row in the matrix by its diagonal term. This process makes rows of PV-nodes in the gain matrix [YV] numerically absent despite physical presence. Because gain matrices [Yθ] and [YV] are of the same power network, they are of the same dimension and sparsity structure. Therefore, they can be stored using the same indexing and addressing information leading to about 35% saving in computer memory or calculating volume requirements. Detailed description of the factorization process and storage schemes for sparse matrix is given by K. Zollenkopf, "Bi-factorization—Basic Calculational Algorithm and Programming Techniques", Large Sparse Sets of Linear Equations: Proceedings of Oxford conference of the Institute of Mathematics and its Application held in April 1970, edited by J. K. Reid.

The efficiency of all inventive SSDL methods is increased by skipping all PV-nodes and factor elements with indices corresponding to PV-nodes while solving (5) for [ΔV]. In other words efficiency can be realized by skipping operations on rows/columns corresponding to PV-nodes in the forward-backward solution of (5). This is possible because rows and columns corresponding to PV-nodes are made numerically inactive by putting large value in diagonal terms of [YV]. This has been implemented and time saving of about 4% of the total solution time, including the time of input/output, could be realized.

Elements of gain matrices [Yθ], and [YV] are possible to be defined independent of rotation or transformation angle in the inventive SSDL-YY model as explained herein. In super decoupling or transformation approach, rotation operators are applied to the complex node injections and the corresponding admittance values that relate them to the system state variables, transform the network equations such that branch or alternatively transmission line or transformer admittance appear to be almost entirely reactive. Better decoupling is thus realized. When rotated the complex branch admittance $Y_{pq} = G_{pq} + jB_{pq}$ gets transformed into $Y_{pq}' = G_{pq}' + jB_{pq}'$, which is almost entirely reactive meaning $G_{pq}'$ is almost of zero value. That means almost $|Y_{pq}'| = |B_{pq}'|$. Therefore, by using $|Y_{pq}'|$ with the same algebraic sign as of $B_{pq}'$ applied, in place of $B_{pq}'$ in the definition of elements of gain matrices given by equations (38), (39), (59), (67), and (82), the gain matrices [Yθ], and [YV] are defined independent of rotation angles. This simplifies SSDL-YY model such that it is easy to program and implement, do not require performing steps involved in equations (102) to (108), and achieve improved acceleration in the loadflow calculation.

Super Super Decoupled Loadflow: X'X'-Version (SSDL-X'X')

The general model, in successive (1θ, 1V) iteration scheme represented by sequence of equations (3) to (6), can be realized as SSDL-X'X', from which manifested are many versions. The elements of [RP], [RQ], [Yθ] and [YV] are defined by (17) to (29).

$$RP_p = [\Delta P_p' + (G_{pp}'/B_{pp}')\Delta Q_p']/V_p^2 \text{—for PQ-nodes} \quad (17)$$

$$RQ_p = [\Delta Q_p' - (G_{pp}'/B_{pp}')\Delta P_p']/V_p \text{—for PQ-nodes} \quad (18)$$

$$RP_p = [\Delta P_p/(K_p * V_p^2)] \text{—for PV-nodes} \quad (19)$$

$$Y\theta_{pq} = -1/X_{pq}' \text{ and } YV_{pq} = -1/X_{pq}' \quad (20)$$

$$Y\theta_{pp} = \sum_{q>p} -Y\theta_{pq} \text{ and } YV_{pp} = b_p' + \sum_{q>p} -YV_{pq} \quad (21)$$

Where, $$b_p' = -2b_p \cos \Phi_p \text{ or}$$

$$b_p' = -b_p \cos \Phi_p + [QSH_p' - (G_{pp}'/B_{pp}')PSH_p']/V_s^2 \text{ or}$$

$$b_p' = 2[QSH_p' - (G_{pp}'/B_{pp}')PSH_p']/V_s^2 \quad (22)$$

$$\Delta P_p' = \Delta P_p \cos \Phi_p + \Delta Q_p \sin \Phi_p \text{—for PQ-nodes} \quad (23)$$

$$\Delta Q_p' = \Delta Q_p \cos \Phi_p - \Delta P_p \sin \Phi_p \text{—for PQ-nodes} \quad (24)$$

$$PSH_p' = PSH_p \cos \Phi_p + QSH_p \sin \Phi_p \text{—for PQ-nodes} \quad (25)$$

$$QSH_p' = QSH_p \cos \Phi_p - PSH_p \sin \Phi_p \text{—for PQ-nodes} \quad (26)$$

$$\cos \Phi_p = \text{Absolute}[B_{pp}/\sqrt{(G_{pp}^2 + B_{pp}^2)}] \geq \cos(\text{any angle from 0 to } -90 \text{ degrees}) \quad (27)$$

$$\sin \Phi_p = -\text{Absolute}[G_{pp}/\sqrt{(G_{pp}^2 + B_{pp}^2)}] \geq \sin(\text{any angle from 0 to } -90 \text{ degrees}) \quad (28)$$

$$K_p = \text{Absolute}(B_{pp}/Y\theta_{pp}) \quad (29)$$

Where, $G_{pp}'$ and $B_{pp}'$ are the transformed values of $G_{pp}$ and $B_{pp}$ as given by equation (106) in the appendix. The factor $K_p$ of (29) is initially restricted to the minimum of 0.75 determined experimentally; however its restriction is lowered to the minimum value of 0.6 when its average over all less than 1.0 values at PV-nodes is less than 0.6. This factor is system and method independent. However it can be tuned for the best possible convergence for any given system. This statement is valid when the factor $K_p$ is applied in the manner of equation (19) in all the models derived in the following from the most general model SSDL-X'X'.

The definition of $Y\theta_{pq}$ in (20) is simplified because it does not explicitly state that it always takes the value of $-B_{pq}$ for a branch connected between two PV-nodes or a PV-node and the slack-node. This fact should be understood implied in all the definitions of $Y\theta_{pq}$ in this document. $X_{pq}'$ in equation (20) is the transformed branch reactance defined in the appendix by equation (107).

However, a whole new class of methods, corresponding to all those derived in the following and prior art, results when the factor $K_p$ is used as a multiplier in the definition of $RP_p$ at PQ-nodes as in (30) instead of divider in $RP_p$ at PV-nodes as given in (19). This will cause changes only in equations (17), (19), and (20) as given in (30), (31), and (32).

$$RP_p = \{[\Delta P_p' + (G_{pp}'/B_{pp}')\Delta Q_p']/V_p^2\} * K_p \text{—for PQ-nodes} \quad (30)$$

$$RP_p = \Delta P_p/V_p^2 \text{—for PV-nodes} \quad (31)$$

$$Y\theta_{pq} = -B_{pq} \text{ and } YV_{pq} = -1/X_{pq}' \quad (32)$$

$X_{pq}'$ in equation (32) is the transformed branch reactance defined in the appendix by equation (107). The best performance of models of this new class has been realized when the factor $K_p$, applied in a manner of equation (30) leading to changes as in (30) to (32), is unrestricted. That means it can take any value as given by equation (29).

Super Super Decoupled Loadflow: YY-Version (SSDL-YY)

If unrestricted rotation is applied to complex branch admittance and transformed susceptance is taken as admittance magnitude value with the same algebraic sign and transformed conductance is assumed zero, the SSDL-X'X' method reduces to SSDL-YY. Though, this model is not very sensitive to the restriction applied to nodal rotation angles, SSDL-YY presented here restricts rotation angles to the maximum of −48 degrees determined experimentally for the best possible convergence from non linearity considerations, which is depicted by equations (35) and (36). However, it gives closely similar performance over wide range of restriction applied to the nodal rotation angles say, from −36 to −90 degrees.

$$RP_p = (\Delta P_p \cos \Phi_p + \Delta Q_p \sin \Phi_p)/V_p^2 \text{—for PQ-nodes} \quad (33)$$

$$RQ_p = (\Delta Q_p \cos \Phi_p - \Delta P_p \sin \Phi_p)/V_p \text{—for PQ-nodes} \quad (34)$$

$$\cos \Phi_p = \text{Absolute}(B_{pp}/\sqrt{(G_{pp}^2 + B_{pp}^2)}) \geq \cos(-48°) \quad (35)$$

$$\sin \Phi_p = -\text{Absolute}(G_{pp}/\sqrt{(G_{pp}^2 + B_{pp}^2)}) \geq \sin(-48°) \quad (36)$$

$$RP_p = \Delta P_p/(K_p V_p^2) \text{—for PV-nodes} \quad (37)$$

$$Y\theta_{pq} = \begin{cases} -Y_{pq} & \text{-for branch } r/x \text{ ratio} \leq 3.0 \\ -(B_{pq} + 0.9(Y_{pq} - B_{pq})) & \text{-for branch } r/x \text{ ratio} > 3.0 \\ & \text{-for branches connected between two PV-nodes} \\ -B_{pq} & \text{or a PV-node and the slack-node} \end{cases} \quad (38)$$

$$YV_{pq} = \begin{cases} -Y_{pq} & \text{-for branch } r/x \text{ ratio} \leq 3.0 \\ -(B_{pq} + 0.9(Y_{pq} - B_{pq})) & \text{-for branch } r/x \text{ ratio} > 3.0 \end{cases} \quad (39)$$

-continued $$Y\theta_{pp} = \sum_{q>p} -Y\theta_{pq} \text{ and } YV_{pp} = b'_p + \sum_{q>p} -YV_{pq} \quad (40)$$

$$b_p' = (QSH_p \cos \Phi_p - PSH_p \sin \Phi_p / V_s^2) - b_p \cos \Phi_p \text{ or}$$

$$b_p' = 2(QSH_p \cos \Phi_p - PSH_p \sin \Phi_p)/V_s^2 \quad (41)$$

where, $K_p$ is defined in equation (29), which is initially restricted to the minimum value of 0.75 determined experimentally; however its restriction is lowered to the minimum value of 0.6 when its average over all less than 1.0 values at PV nodes is less than 0.6. Restrictions to the factor $K_p$ as stated in the above is system independent. However it can be tuned for the best possible convergence for any given system. In case of systems of only PQ-nodes and without any PV-nodes, equations (38) and (39) simply be taken as $Y\theta_{pq} = YV_{pq} = -Y_{pq}$. Branch admittance magnitude in (38) and (39) is of the same algebraic sign as its susceptance. Elements of the two gain matrices differ in that diagonal elements of [YV] additionally contain the b' values given by equations (40) and (41) and in respect of elements corresponding to branches connected between two PV-nodes or a PV-node and the slack-node. Equations (35) and (36) with inequality sign implies that nodal rotation angles are restricted to maximum of −48 degrees for SSDL-YY. The model consists of equations (3) to (6), (33) to (41), and (29). In two simple variations of the SSDL-YY model, one is to make $YV_{pq} = Y\theta_{pq}$ and the other is to make $Y\theta_{pq} = YV_{pq}$.

The steps of loadflow calculation method, SSDL-YY method are shown in the flowchart of FIG. 2. Referring to the flowchart of FIG. 2, different steps are elaborated in steps marked with similar letters in the following. Double lettered steps are the characteristic steps of SSDL-YY method. The words "Read system data" in Step-a correspond to step-10 and step-20 in FIG. 5, and step-14, step-20, step-32, step-44, step-50 in FIG. 6. All other steps in the following correspond to step-30 in FIG. 5, and step-60, step-62, and step-64 in FIG. 6.

a. Read system data and assign an initial approximate solution. If better solution estimate is not available, set voltage magnitude and angle of all nodes equal to those of the slack-node. This is referred to as the slack-start.
b. Form nodal admittance matrix, and Initialize iteration count ITRP=ITRQ=r=0
cc. Compute Cosine and Sine of nodal rotation angles using equations (35) and (36), and store them. If they, respectively, are less than the Cosine and Sine of −48 degrees, equate them, respectively, to those of −48 degrees.
dd. Form (m+k)×(m+k) size matrices [Yθ] and [YV] of (1) and (2) respectively each in a compact storage exploiting sparsity. The matrices are formed using equations (38), (39), (40), and (41). In [YV] matrix, replace diagonal elements corresponding to PV-nodes by very large value (say, $10.0^{10}$). In case [YV] is of dimension (m×m), this is not required to be performed. Factorize [Yθ] and [YV] using the same ordering of nodes regardless of node-types and store them using the same indexing and addressing information. In case [YV] is of dimension (m×m), it is factorized using different ordering than that of [Yθ].
e. Compute residues [ΔP] at PQ- and PV-nodes and [ΔQ] at only PQ-nodes. If all are less than the tolerance (ϵ), proceed to step-n. Otherwise follow the next step.
ff. Compute the vector of modified residues [RP] as in (33) for PQ-nodes, and using (37) and (29) for PV-nodes.
g. Solve (3) for [Δθ] and update voltage angles using, [θ]= [θ]+[Δθ].
h. Set voltage magnitudes of PV-nodes equal to the specified values, and Increment the iteration count ITRP=ITRP+1 and r=(ITRP+ITRQ)/2.
i. Compute residues [ΔP] at PQ- and PV-nodes and [ΔQ] at PQ-nodes only. If all are less than the tolerance (ϵ), proceed to step-n. Otherwise follow the next step.
j. Compute the vector of modified residues [RQ] as in (34) for only PQ-nodes.
k. Solve (5) for [ΔV] and update PQ-node magnitudes using [V]=[V]+[ΔV]. While solving equation (5), skip all the rows and columns corresponding to PV-nodes.
l. Calculate reactive power generation at PV-nodes and tap positions of tap-changing transformers. If the maximum and minimum reactive power generation capability and transformer tap position limits are violated, implement the violated physical limits and adjust the loadflow solution by the method described in "LTC Transformers and MVAR violations in the Fast Decoupled Load Flow, IEEE Trans., PAS-101, No. 9, PP. 3328-3332, September 1982".
m. Increment the iteration count ITRQ=ITRQ+1 and r=(ITRP+ITRQ)/2, and Proceed to step-e.
n. From calculated values of voltage magnitude and voltage angle at PQ-nodes, voltage angle and reactive power generation at PV-nodes, and tap position of tap changing transformers, calculate power flows through power network components.

Super Super Decoupled Loadflow: XX-Version (SSDL-XX)

If no or zero rotation is applied, the SSDL-X'X' method reduces to SSDL-XX, which is the simplest form of SSDL-X'X'. The SSDL-XX model comprises equations (3) to (6), (42) to (48), and (29).

$$RP_p = [\Delta P_p + (G_{pp}/B_{pp})\Delta Q_p]/V_p^2 \text{—for PQ-nodes} \quad (42)$$

$$RQ_p = [\Delta Q_p - (G_{pp}/B_{pp})\Delta P_p]/V_p \text{—for PQ-nodes} \quad (43)$$

$$RP_p = \Delta P_p/(K_p V_p^2) \text{—for PV-nodes} \quad (44)$$

$$Y\theta_{pq} = \begin{bmatrix} -1.0/X_{pq} & \text{-for all other branches} \\ -B_{pq} & \text{-for branches connected between two } PV\text{-nodes} \\ & \text{or a } PV\text{-node and the slack-node} \end{bmatrix} \quad (45)$$

$$YV_{pq} = -1.0/X_{pq} \quad \text{-for all branches} \quad (46)$$

$$Y\theta_{pp} = \sum_{q>p} -Y\theta_{pq} \text{ and } YV_{pp} = b'_p + \sum_{q>p} -YV_{pq} \quad (47)$$

$$b_p' = -2b_p \text{ or}$$

$$b_p' = -b_p + [QSH_p - (G_{pp}/B_{pp})PSH_p]/V_s^2 \text{ or}$$

$$b_p' = 2[QSH_p - (G_{pp}/B_{pp})PSH_p]/V_s^2 \quad (48)$$

where, $K_p$ is defined in equation (29). This is the simplest method with very good performance for distribution networks in absence of PV-nodes or alternatively for systems containing only PQ-nodes. The large value of the difference

[(1/X)−B], particularly for high R/X ratio branches connected to PV-nodes, creates modeling error when PV-nodes are present in a system.

Super Super Decoupled Loadflow: BX-Version (SSDL-BX)

If super decoupling is applied only to QV-sub problem, the SSDL-XX model reduces to SSDL-BX, which makes it perform better for systems containing PV-nodes. The SSDL-BX model comprises equations (3) to (6), (49) to (51), (47) and (48). This model can be referred to as Advanced BX-Fast Decoupled Loadflow.

$$RP_p = \Delta P_p'/V_p^2 \text{—for all nodes} \quad (49)$$

$$RQ_p = [\Delta Q_p - (G_{pp}/B_{pp})\Delta P_p]/V_p \text{—for PQ-nodes} \quad (50)$$

$$Y\theta_{pq} = -B_{pq} \text{ and } YV_{pq} = -1/X_{pq} \quad (51)$$

It should be noted that Amerongen's General-purpose Fast Decoupled Loadflow model described in "A general-purpose version of the Fast Decoupled Loadflow", IEEE Transactions, PWRS-4, pp. 760-770, May 1989; has turned out to be an approximation of this model. The approximation involved is only in equation (50). However, numerical performance is found to be only slightly better but more reliable than that of the Amerongen's method.

Super Super Decoupled Loadflow: X'B'-Version (SSDL-X'B')

This model consists of equations (3) to (6), (52) to (57), and (23) to (29).

$$RP_p = [\Delta P_p' + (G_{pp}'/B_{pp}')\Delta Q_p']/V_p^2 \text{—for PQ-nodes} \quad (52)$$

$$RQ_p = \Delta Q_p'/V_p \text{—for PQ-nodes} \quad (53)$$

$$RP_p = [\Delta P_p/(K_p*V_p^2)] \text{—for PV-nodes} \quad (54)$$

$$Y\theta_{pq} = -1/X_{pq}' \text{ and } YV_{pq} = -B_{pq}' \quad (55)$$

$$Y\theta_{pp} = \sum_{q>p} -Y\theta_{pq} \text{ and } YV_{pp} = b_p' + \sum_{q>p} -YV_{pq} \quad (56)$$

Where, $$b_p' = -2b_p \cos\Phi_p \text{ or} \quad (57)$$
$$b_p' = -b_p \cos\Phi_p + QSH_p'/V_s^2 \text{ or}$$
$$b_p' = 2QSH_p'/V_s^2$$

Where, $\Delta P_p'$, $\Delta Q_p'$, $PSH_p'$, $QSH_p'$, $\cos\Phi_p$, $\sin\Phi_p$, $K_p$ are defined in (23) to (29), and $B_{pq}'$ and $X_{pq}'$ are the transformed branch susceptance and reactance defined in the appendix by equations (105) and (107). Best performance of this model could be achieved by restricting $\Phi_p$ in (27) and (28) to less than or equal to −48°.

Super Super Decoupled Loadflow: YB'-Version (SSDL-YB')

The equation (52) in SSDL-X'B' implies unrestricted $\Phi_p$ is applied and it can take values up to −90 degrees. Therefore, (52) can be modified to (58) with consequent modification of (55) into (59). This model consists of equations (3) to (6), (58), (53), (54), (59), (56) and (57), and (23) to (29).

$$RP_p = [\Delta P_p*\text{Absolute}[B_{pp}/\sqrt{(G_{pp}^2+B_{pp}^2)}] + \Delta Q_p*[-\text{Absolute}[G_{pp}/\sqrt{(G_{pp}^2+B_{pp}^2)}]]/V_p^2 \text{—for PQ-nodes} \quad (58)$$

$$Y\theta_{pq} = -Y_{pq} \text{ and } YV_{pq} = -B_{pq}' \quad (59)$$

The best performance of this method could be achieved by restricting $\Phi_p$ in (27) and (28) to less than or equal to −48 degrees. Where, $\Delta P_p'$, $\Delta Q_p'$, $PSH_p'$, $QSH_p'$, $\cos\Phi_p$, $\sin\Phi_p$, $K_p$ are defined in (23) to (29), and $B_{pq}'$ is the transformed branch susceptance defined in the appendix by equations (105).

Super Super Decoupled Loadflow: B'X'-Version (SSDL-B'X')

This model consists of equations (3) to (6), (60) to (65), and (23) to (29).

$$RP_p = \Delta P_p'/V_p^2 \text{—for PQ-nodes} \quad (60)$$

$$RQ_p = [\Delta Q_p' - (G_{pp}'/B_{pp}')\Delta P_p']/V_p \text{—for PQ-nodes} \quad (61)$$

$$RP_p = [\Delta P_p/(K_p*V_p^2)] \text{—for PV-nodes} \quad (62)$$

$$Y\theta_{pq} = -B_{pq}' \text{ and } YV_{pq} = -1/X_{pq}' \quad (63)$$

$$Y\theta_{pp} = \sum_{q>p} -Y\theta_{pq} \text{ and } YV_{pp} = b_p' + \sum_{q>p} -YV_{pq} \quad (64)$$

Where, $$b_p' = -2b_p \cos\Phi_p \text{ or} \quad (65)$$
$$b_p' = -b_p \cos\Phi_p + [QSH_p' - (G_{pp}'/B_{pp}')PSH_p']/V_s^2 \text{ or}$$
$$b_p' = 2[QSH_p' - (G_{pp}'/B_{pp}')PSH_p']/V_s^2$$

Where, $\Delta P_p'$, $\Delta Q_p'$, $PSH_p'$, $QSH_p'$, $\cos\Phi_p$, $\sin\Phi_p$, $K_p$ are defined in (23) to (29), and $B_{pq}'$ and $X_{pq}'$ are the transformed branch susceptance and reactance defined in the appendix by equations (105) and (107). Best performance of this model could be achieved by restricting $\Phi_p$ in (27) and (28) to less than equal to −48°.

Super Super Decoupled Loadflow: B'Y-Version (SSDL-B'Y)

The relation (61) in SSDL-B'X' implies unrestricted $\Phi_p$ is applied and it can take values up to −90 degrees. Therefore, (61) can be modified to (66) with consequent modification of (63) into (67).

$$RQ_p = [\Delta Q_p*\text{Absolute}[B_{pp}/\sqrt{(G_{pp}^2+B_{pp}^2)}] - \Delta P_p*[-\text{Absolute}[G_{pp}/\sqrt{(G_{pp}^2+B_{pp}^2)}]]/V_p^2 \text{—for PQ-nodes} \quad (66)$$

$$Y\theta_{pq} = -B_{pq}' \text{ and } YV_{pq} = -Y_{pq} \quad (67)$$

This model consists of equations (3) to (6), (60), (66), (62), (67), (64) and (65), and (23) to (29). Best performance of this model could be achieved by restricting $\Phi_p$ in (27) and (28) to less than or equal to −48 degrees. Where, $\Delta P_p'$, $\Delta Q_p'$, $PSH_p'$, $QSH_p'$, $\cos\Phi_p$, $\sin\Phi_p$, $K_p$ are defined in (23) to (29), and $B_{pq}'$ is the transformed branch susceptance defined in the appendix by equation (105).

Simultaneous (1V, 1θ) Iteration Scheme

An ideal to be approached for the decoupled loadflow models is the constant matrix loadflow model described in "Fast Super Decoupled Loadflow", IEE proceedings Part-C, Vol. 139, No. 1, pp. 13-20, January 1992; referred in this document as BGGB-model. In an attempt to imitate it, a decoupled class of models with simultaneous (1V, 1θ) iteration scheme depicted by sequence of equations (68) to (72) is invented. This scheme involves only one mismatch calculation in an iteration. The correction vector is calculated in two separate parts of voltage magnitude and voltage angle corrections without intermediate updating. Each iteration involves one calculation of [RQ], [ΔV], and [RP], [Δθ] to update [V] and [θ].

$$[\Delta V]=[YV]^{-1}[RQ] \quad (68)$$

$$[RP]=[\Delta P/]-[G][\Delta V] \quad (69)$$

$$[\Delta \theta]=[Y\theta]^{-1}[RP] \quad (70)$$

$$[\theta]=[\theta]+[\Delta \theta] \quad (71)$$

$$[V]=[V]+[\Delta V] \quad (72)$$

In this invented class, each model differs only in the definition of elements of [RQ] and [Yv]. The accuracy of models depends only on the accuracy of calculation of [ΔV]. The greater the angular spread of branches terminating at PQ-nodes, the greater the inaccuracy in the calculation of [ΔV].

Super Super Decoupled Loadflow: BGX'-Version (SSDL-BGX')

Numerical performance could further be improved by organizing the solution in a simultaneous (1V, 1θ) iteration scheme represented by sequence of equations (68) to (72). The elements of [RP], [RQ], [Yθ] and [YV] are defined by (73) to (80).

$$RQ_p=[\Delta Q_p'-(G_{pp}'/B_{pp}')\Delta P_p']/V_p \text{—for PQ-nodes} \quad (73)$$

$$RP_p = \left[(\Delta P_p/V_p) - \sum_{q=1}^{m} G_{pq}\Delta V_q\right]/V_p \text{ -for all nodes or} \quad (74)$$

$$RP_p = \left[(\Delta P_p/V_p) - \sum_{q=1}^{m} G_{pq}\Delta V_q - (g_p'\Delta V_p)\right]/V_p \text{ -for PQ-nodes, and} \quad (75)$$

$$RP_p = \left[(\Delta P_p/V_p) - \sum_{q=1}^{m} G_{pq}\Delta V_q\right]/V_p \text{ -for PV-nodes} \quad (76)$$

$$Y\theta_{pq}=-B_{pq} \text{ and } YV_{pq}=-1/X_{pq}' \quad (77)$$

$$Y\theta_{pp} = \sum_{q>p} -Y\theta_{pq} \text{ and } YV_{pp} = b_p' + \sum_{q>p} -YV_{pq} \quad (78)$$

Where, $b_p' = 2b_p \text{Cos}\Phi_p$ or (79)

$b_p' = b_p\text{Cos}\Phi_p + [QSH_p' - (G_{pp}'/B_{pp}')PSH_p']/V_s^2$ or $b_p' = 2[QSH_p' - (G_{pp}'/B_{pp}')PSH_p']/V_s^2$ $g_p' = 2b_p\text{Sin}\Phi_p$ or (80)

$g_p' = b_p\text{Sin}\Phi_p + [PSH_p' + (G_{pp}'/B_{pp}')QSH_p']/V_s^2$ or $g_p' = 2[PSH_p' - (G_{pp}'/B_{pp}')QSH_p']/V_s^2$ Where, $\Delta P_p'$, $\Delta Q_p'$, $PSH_p'$, $QSH_p'$, $\text{Cos }\Phi_p$, $\text{Sin }\Phi_p$ are defined in (23) to (28), and $X_{pq}'$ is the transformed branch reactance defined in the appendix by equations (107). The SSDL-BGX' model comprises equations (68) to (80), and (23) to (28). Best possible convergence could be achieved by restricting rotation angles $\Phi_p$ in the range of −10° to −20° in equations (27) and (28). The model is embodied in the flowchart of FIG. 3.

Super Super Decoupled Loadflow: BGY-Version (SSDL-BGY)

If unrestricted rotation is applied and transformed susceptance is taken as admittance values and transformed conductance is assumed zero, the SSDL-BGX' model reduces to SSDL-BGY as defined by equations (81), (74), (75), (76), (82) to (85).

$$RQ_p=\Delta Q_p'/V_p=(\Delta Q_p \text{ Cos } \Phi_p - \Delta P_p \text{ Sin } \Phi_p)/V_p \text{—for PQ-nodes} \quad (81)$$

$$Y\theta_{pq}=-B_{pq} \text{ and } YV_{pq}=-Y_{pq} \quad (82)$$

$$Y\theta_{pp} = \sum_{q>p} -Y\theta_{pq} \text{ and } YV_{pp} = b_p' + \sum_{q>P} -YV_{pq} \quad (83)$$

Where, $b_p' = -2b_p\text{Cos}\Phi_p$ or (84)

$b_p' = -b_p\text{Cos}\Phi_p + (QSH_p\text{Cos}\Phi_p - PSH_p\text{Sin}\Phi_p)/V_s^2$ or $b_p' = 2(QSH_p - PSH_p\text{Sin}\Phi_p)/V_s^2$ $g_p' = 2b_p\text{Sin}\Phi_p$ or (85)

$g_p' = b_p\text{Sin}\Phi_p + (PSH_p\text{Cos}\Phi_p + QSH_p\text{Sin}\Phi_p)/V_s^2$ or $b_p' = 2(PSH_p\text{Cos}\Phi_p + QSH_p\text{Sin}\Phi_p)/V_s^2$ The SSDL-BGY model comprises equations (68) to (72), and (81), (74), (75), (76), (82) to (85). It is the special case of the SSDL-BGX' model.

Super Super Decoupled Loadflow: BGX-Version (SSDL-BGX)

If no or zero rotation is applied, the SSDL-BGX' model reduces to SSDL-BGX as defined by equations (86), (74), (75), (76), (87) to (90).

$$RQ_p=[\Delta Q_p-(G_{pp}/B_{pp})\Delta P_p]/V_p \text{—for PQ-nodes} \quad (86)$$

$$Y\theta_{pq}=-B_{pq} \text{ and } YV_{pq}=-1/X_{pq} \quad (87)$$

$$Y\theta_{pp} = \sum_{q>p} -Y\theta_{pq} \text{ and } YV_{pp} = b_p' + \sum_{q>P} -YV_{pq} \quad (88)$$

$$b_p'=-2b_p \text{ or } =-b_p+[QSH_p-(G_{pp}/B_{pp})PSH_p]/V_s^2 \text{ or } = 2[QSH_p-(G_{pp}/B_{pp})PSH_p]/V_s^2 \quad (89)$$

$$g_p'=0.0 \text{ or } =[PSH_p+(G_{pp}/B_{pp})QSH_p]/V_s^2 \text{ or } =2[PSH_p+(G_{pp}/B_{pp})QSH_p]/V_s^2 \quad (90)$$

The SSDL-BGX model comprises equations (68) to (72), and (86), (74), (75), (76), (87) to (90). It is again the special case of the SSDL-BGX' model.

The steps of loadflow calculation methods, SSDL-BGX', SSDL-BGY and SSDL-BGX methods are shown in the flowchart of FIG. 3. Referring to the flowchart of FIG. 3, different steps are elaborated in steps marked with similar letters in the following. Triple lettered steps are the characteristic steps of SSDL-BGX', SSDL-BGY and SSDL-BGX methods. The words "Read system data" in Step-a correspond to step-10 and step-20 in FIG. 5, and step-14, step-20, step-32, step-44, step-50 in FIG. 6. All other steps in the following correspond to step-30 in FIG. 5, and step-60, step-62, and step-64 in FIG. 6.

a. Read system data and assign an initial approximate solution. If better solution estimate is not available, set voltage magnitude and angle of all nodes equal to those of the slack-node. This is referred to as the slack-start.

b. Form nodal admittance matrix, and Initialize iteration count ITR=0.

ccc. Compute Sine and Cosine of nodal rotation angles using equations (28) and (27), and store them. If they, respectively, are less than the Sine and Cosine of any angle set say, in the range −10 to −20 degrees, equate them, respectively, to those of the same angle in the range −10 to −20 degrees. In case of zero rotation, Sine and Cosine value vectors are not required to be stored.

ddd. Form (m+k)×(m+k) size matrices [Yθ] and [YV] of (1) and (2) respectively each in a compact storage exploiting sparsity
1) In case of SSDL-BGX'-method, the matrices are formed using equations (77), (78), and (79)
2) In case of SSDL-BGY-method, the matrices are formed using equations (82), (83), and (84)
3) In case of SSDL-BGX-method, the matrices are formed using equations (87), (88), and (89)
In [YV] matrix, replace diagonal elements corresponding to PV-nodes by very large value say, $10.0^{10}$. In case [YV] is of dimension (m×m), this is not required to be performed. Factorize [Yθ] and [YV] using the same ordering of nodes regardless of node-types and store them using the same indexing and addressing information. In case [YV] is of dimension (m×m), it is factorized using different ordering than that of [Yθ].

e. Compute residues [ΔP] at PQ- and PV-nodes and [ΔQ] at only PQ-nodes. If all are less than the tolerance (ε), proceed to step-n. Otherwise follow the next step.

fff. Compute the vector of modified residues [RQ] using (73) in case of SSDL-BGX', using (81) in case of SSDL-BGY, and using (86) in case of SSDL-BGX method for only PQ-nodes. Solve (68) for [ΔV]. While solving equation (68), skip all the rows and columns corresponding to PV-nodes. Compute the vector of modified residues [RP] using (74) or (75) and (76). Solve (70) for [Δθ].

ggg. Update voltage angles using, [θ]=[θ]+[Δθ]. and update PQ-node voltage magnitudes using [V]=[V]+[ΔV]. Set voltage magnitudes of PV-nodes equal to the specified values.

l. Calculate reactive power generation at PV-nodes and tap positions of tap-changing transformers. If the maximum and minimum reactive power generation capability and transformer tap position limits are violated, implement the violated physical limits and adjust the loadflow solution by the method described in "LTC Transformers and MVAR violations in the Fast Decoupled Load Flow, IEEE Trans., PAS-101, No. 9, PP. 3328-3332, September 1982".

m. Increment the iteration count ITRQ=ITRQ+1 and r=(ITRP+ITRQ)/2, and Proceed to step-e.

n. From calculated values of voltage magnitude and voltage angle at PQ-nodes, voltage angle and reactive power generation at PV-nodes, and tap position of tap changing transformers, calculate power flows through power network components.

The SSDL-BGX', SSDL-BGY and SSDL-BGX methods differ only in steps-ccc and -ddd defining gain matrices, and step-fff for calculating [RP] and [RQ].

Super Super Decoupled Loadflow: X'$G_{pv}$X'-Version (SSDL-X'$G_{pv}$X')

Numerical performance could be improved by organizing the solution in a simultaneous (1V, 1θ) iteration scheme represented by sequence of equations (68) to (72). The elements of [RP], [RQ], [Yθ] and [YV] for this model are defined by (91) to (94), and (78), (79), and (80).

$$RQ_p = [\Delta Q_p' - (G_{pp}'/B_{pp}')\Delta P_p']/V_p \text{—for PQ-nodes} \tag{91}$$

$$RP_p = [\{[\Delta P_p' + (G_{pp}'/B_{pp}')\Delta Q_p']/V_p\} - (g_p'\Delta V_p)]/V_p \text{—for PQ-nodes} \tag{92}$$

$$RP_p = \left[(\Delta P_p/V_p) - \sum_{q=1}^{m} G_{pq}\Delta V_q\right]/(K_p^* V_p) \text{ for PV-nodes} \tag{93}$$

$$Y\theta_{pq} = -1/X_{pq}' \text{ and } YV_{pq} = -1/X_{pq}' \tag{94}$$

Where, $\Delta P_p'$, $\Delta Q_p'$, $PSH_p'$, $QSH_p'$, Cos $\Phi_p$, Sin $\Phi_p$, $K_p$ are defined in (23) to (29), and $X_{pq}'$ is the transformed branch reactance defined in the appendix by the equation (107). Again, if unrestricted rotation is applied and transformed susceptance is taken as admittance values and transformed conductance is assumed zero, the SSDL-X'$G_{pv}$X' model reduces to SSDL-Y$G_{pv}$Y. If no or zero rotation is applied, the SSDL-X'$G_{pv}$X' model reduces to SSDL-X$G_{pv}$X. The SSDL-X'$G_{pv}$X' model comprises equations (68) to (72), (91) to (94), (78) to (80), and (23) to (29).

The steps of loadflow calculation methods, SSDL-X'$G_{pv}$X', SSDL-Y$G_{pv}$Y and SSDL-X$G_{pv}$X methods are shown in the flowchart of FIG. 4. Referring to the flowchart of FIG. 4, different steps are elaborated in steps marked with similar letters in the following. Four lettered steps are the characteristic steps of SSDL-X'$G_{pv}$X', SSDL-Y$G_{pv}$Y and SSDL-X$G_{pv}$X methods. These methods are useful particularly for distribution systems without PV-nodes. The words "Read system data" in Step-a correspond to step-10 and step-20 in FIG. 5, and step-14, step-20, step-32, step-44, step-50 in FIG. 6. All other steps in the following correspond to step-30 in FIG. 5, and step-60, step-62, and step-64 in FIG. 6.

a. Read system data and assign an initial approximate solution. If better solution estimate is not available, set voltage magnitude and angle of all nodes equal to those of the slack-node. This is referred to as the slack-start.

b. Form nodal admittance matrix, and Initialize iteration count ITR=0.

cccc. Compute Sine and Cosine of nodal rotation angles using equations (28) and (27), store them. If they, respectively, are less than the Sine and Cosine of any angle set say, 0 to −90 degrees, equate them, respectively, to those of the same angle in the range 0 to −90 degrees. In case of zero rotation, Sine and Cosine vectors are not required to be stored.

dddd. Form (m+k)×(m+k) size matrices [Yθ] and [YV] of (1) and (2) respectively each in a compact storage exploiting sparsity using equations (94), (78), and (79). In [YV] matrix, replace diagonal elements corresponding to PV-nodes by very large value say, $10.0^{10}$. In case [YV] is of dimension (m×m), this is not required to be performed. Factorize [Yθ] and [YV] using the same ordering of nodes regardless of node-types and store them using the same indexing and addressing information. In case [YV] is of dimension (m×m), it is factorized using different ordering than that of [Yθ].

e. Compute residues [ΔP] at PQ- and PV-nodes, and [ΔQ] at only PQ-nodes. If all are less than the tolerance (ε), proceed to step-n. Otherwise follow the next step.

ffff. Compute [RQ] using (91) for only PQ-nodes. Solve (68) for [ΔV]. While solving equation (68), skip all the rows and columns corresponding to PV-nodes. Compute the vector of modified residues [RP] using equations (92), (93), (80) and (29). Solve (70) for [Δθ].

ggg. Update voltage angles using, [θ]=[θ]+[Δθ]. and update PQ-node voltage magnitudes using [V]=[V]+[ΔV]. Set voltage magnitudes of PV-nodes equal to the specified values.

l. Calculate reactive power generation at PV-nodes and tap positions of tap-changing transformers. If the maximum and minimum reactive power generation capability and transformer tap position limits are violated, implement the violated physical limits and adjust the loadflow solution by the method described in "LTC Transformers and MVAR violations in the Fast Decoupled Load Flow, IEEE Trans., PAS-101, No. 9, PP. 3328-3332, September 1982".

m. Increment the iteration count ITRQ=ITRQ+1 and r=(ITRP+ITRQ)/2, and Proceed to step-e.

n. From calculated values of voltage magnitude and voltage angle at PQ-nodes, voltage angle and reactive power generation at PV-nodes, and tap position of tap changing transformers, calculate power flows through power network components.

Models Using Global Corrections

It is possible that all the above described models can be organized to produce corrections to the initial estimate solution. It involves storage of the vector of modified residues and replacing the equations (17), (18), (19), which are the most general form of equations appearing in the description, and (49) by (95), (96), (97), and (98) respectively, and (4) or (71) and (6) or (72) respectively by (99) and (100). Superscript '0' in equations (99) and (100) indicates the initial solution estimate.

$$RP_p^r = [(\Delta P_p^r)' + (G_{pp}'/B_{pp}')(\Delta Q_p^r)']/(V_p^r)^2 + RP_p^{(r-1)} \quad (95)$$

$$RQ_p^r = [(\Delta Q_p^r)' - (G_{pp}'/B_{pp}')(\Delta P_p^r)']/(V_p^r)^2 + RQ_p^{(r-1)} \quad (96)$$

$$RP_p^r = \Delta P_p^r/[K_p(V_p^r)^2] + RP_p^{(r-1)} \quad (97)$$

$$RP_p^r = \Delta P_p^r/(V_p^r)^2 + RP_p^{(r-1)} \quad (98)$$

$$\theta_p^r = \theta_p^0 + \Delta\theta_p^r \quad (99)$$

$$V_p^r = V_p^0 + \Delta V_p^r \quad (100)$$

Rectangular Coordinate Formulations of Loadflow Models

This involves following changes in the equations describing the loadflow models formulated in polar coordinates.

(i) Replace $\theta$ and $\Delta\theta$ respectively by f and $\Delta f$ in equations (1), (3), (4), (70), (71) and (99)

(ii) Replace V and $\Delta V$ respectively by e and $\Delta e$ in equations (2), (5), (6), (68), (69), (72) and (100)

(iii) Replace $V_p$ by $e_p$ and $V_s$ by $e_s$ in equations (17) to (19), (22), (30), (31), (33), (34), (37), (41) to (44), (48) to (50), (52) to (54), (57), (58), (60) to (62), (65), (66), (73), (74), (75), (76), (79) to (81), (84) to (86), (89) to (93), (95), (96), (97), (98). The subscript 's' indicates the slack-node variable.

(iv) After calculation of corrections to the imaginary part of complex voltage ($\Delta f$) of PV-nodes and updating the imaginary component (f) of PV-nodes, calculate real component by:

$$e_p = \sqrt{V_{sp}^2 - f_p^2} \quad (101)$$

Some simple variations in the SSDL models of the above description are the use of $V_p$ and $V_p^2$ interchangeably in all expressions of $RP_p$, and the use of 1.0 for $V_s^2$ in all expressions of $b_p'$ and $g_p'$. However, in equations (74), (75), (76), (92), and (93) interchangeable use of $V_p$ and $V_p^2$ is allowed only when any one of the dividing term $V_p$ assumes value of 1.0.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respect as illustrative and not restrictive, the scope of the invention being indicated by the appended claims in addition to the foregoing description, and all changes which come within the meaning and range of equivalency of the claims are therefore intended to be embraced therein.

APPENDIX

The following steps give the procedure for determining transformed/rotated branch admittance necessary in forming symmetrical gain matrices [YV] and/or [Yθ] of the SSDL models.

1. Compute:

$$\Phi_p = \arctan(G_{pp}/B_{pp}) \text{ and}$$

$$\Phi_q = \arctan(G_{qq}/B_{qq}) \quad (102)$$

2. Compute the average of rotations at the terminal nodes p and q of a branch:

$$\Phi_{av} = (\Phi_p + \Phi_q)/2 \quad (103)$$

3. Compare $\Phi_{av}$ with the Limiting Rotation Angle (LRA) and let $\Phi_{av}$ to be the smaller of the two:

$$\Phi_{av} = \text{minimum}(\Phi_{av}, LRA) \quad (104)$$

4. Compute transformed pq-th element of the admittance matrix:

$$\overline{Y}_{pq}' = G_{pq}' + jB_{pq}' = (\cos\Phi_{av} + j\sin\Phi_{av})(G_{pq} + jB_{pq}) \quad (105)$$

$$\overline{Y}_{pp}' = G_{pp}' + jB_{pp}' = \sum_{q>p} -(G_{pq}' + jB_{pq}') \quad (106)$$

5. Note that the transformed branch reactance is:

$$X_{pq}' = B_{pq}'/(G_{pq}'^2 + B_{pq}'^2) \quad (107)$$

Similarly, $X_{pp}' = B_{pp}'/(G_{pp}'^2 + B_{pp}'^2)$ (108)

The invention claimed is:

1. A method of forming/defining and solving a model of a power network to affect control of voltages and power flows in a power system, comprising the steps of:

obtaining on-line/simulated data of open/close status of switches and circuit breakers in a power network, and reading data of operating limits of a power network components including PV-node, a generator-node where Real-Power-P and Voltage-Magnitude-V are given/assigned/specified/set, generators maximum and minimum reactive power generation capability limits and transformers tap position limits, obtaining on-line readings of given/assigned/specified/set real and reactive power at PQ-nodes, the load-nodes where Real-Power-P and Reactive-Power-Q are given/assigned/specified/set, real power and voltage magnitude at PV-nodes, voltage magnitude and angle at the reference/slack node, and transformer turns ratios, which are the controlled variables/parameters, initiating loadflow calculation with initial approximate/guess solution of the same voltage magnitude and angle as those of the slack/reference node for all the other nodes referred to as the slack-start, forming and storing factorized gain matrices [Yθ] and [YV] using the same indexing and addressing information for both as they are of the same dimension and sparsity structure, wherein said [Yθ] relate vector of modified real power mismatches [RP] to angle corrections vector [Δθ] in equation [RP]=[Yθ][Δθ] referred to as P-θ sub-problem, and said [YV] relate vector of modified reactive power mismatches [RQ] to voltage magnitude corrections vector [ΔV] in equation [RQ]=[YV][ΔV] referred to as Q-V sub-problem, restricting transformation/rotation angle $\Phi_p$ to maximum −48° in determining transformed real and reactive power mismatch as, $$\Delta P_p' = \Delta P_p \cos \Phi_p + \Delta Q_p \sin \Phi_p \text{—for PQ-nodes} \quad (23)$$

$$\Delta Q_p' = \Delta Q_p \cos \Phi_p - \Delta P_p \sin \Phi_p \text{—for PQ-nodes} \quad (24)$$

Wherein, $\Delta P_p$ and $\Delta Q_p$ are real and reactive power mismatches at node-p, calculating modified real and reactive power mismatches as given in the following in the most general form of equations that take different form for different Super Super Decoupled Loadflow model:

$$RP_p = [\Delta P_p' + (G_{pp}''/B_{pp}')\Delta Q_p']/V_p^2 \text{—for PQ-nodes} \quad (17)$$

$$RQ_p = [\Delta Q_p' - (G_{pp}''/B_{pp}')\Delta P_p']/V_p \text{—for PQ-nodes} \quad (18)$$

and calculating modified real power mismatch at a PV-node as, $$RP_p = \Delta P_p/(K_p V_p^2) \text{—for PV-nodes} \quad (19)$$

Wherein, $K_p = \text{Absolute}(B_{pp}/Y\theta_{pp})$ \quad (29)

and $V_p$ is voltage magnitude at node-p, and $B_{pp}$ is imaginary part of the diagonal element $Y_{pp}$ of the admittance matrix without network shunts, and $Y\theta_{pp}$ is the diagonal element of the gain matrix [Yθ], using network shunt parameter $b_p'$ that appears in diagonal elements of gain matrix [YV] as given in the following in the most general form of equations that take different form for different loadflow model:

$$b_p' = -b_p \cos \Phi_p + [QSH_p' - (G_{pp}''/B_{pp}')PSH_p']/V_s^2 \text{ or}$$

$$b_p' = 2[QSH_p' - (G_{pp}''/B_{pp}')PSH_p']/V_s^2 \quad (22)$$

wherein, $G_{pp}'$ and $B_{pp}'$ are the real and imaginary parts of the transformed diagonal element $Y_{pp}'$ of the admittance matrix without network shunts, $b_p$ is network shunt susceptance at node-p, $V_s$ is slack-node voltage magnitude, and $$PSH_p' = PSH_p \cos \Phi_p + QSH_p \sin \Phi_p \text{—for PQ-nodes} \quad (25)$$

$$QSH_p' = QSH_p \cos \Phi_p - PSH_p \sin \Phi_p \text{—for PQ-nodes} \quad (26)$$

wherein, $PSH_p$, and $QSH_p$ are given/specified/scheduled/set real and reactive power respectively, performing loadflow calculation by solving a Super Super Decoupled Loadflow model of the power network defined by set of equations [RP]=[Yθ][Δθ] and [RQ]=[YV][ΔV] employing successive (1θ, 1V) iteration scheme, wherein each iteration involves one calculation of [RP] and [Δθ] to update voltage angle vector [θ] and then one calculation of [RQ] and [ΔV] to update voltage magnitude vector [V], to calculate values of the voltage angle and the voltage magnitude at PQ-nodes, voltage angle and reactive power generation at PV-nodes, and turns ratio of tap-changing transformers in dependence on the set of said obtained-online readings, or given/scheduled/specified/set values of controlled variables/parameters and physical limits of operation of the network components, evaluating loadflow calculation for any of the over loaded power network components and for under/over voltage at any of the network nodes, correcting one or more controlled parameters and repeating the calculating, performing, evaluating, and correcting steps until evaluating step finds no over loaded components and no under/over voltages in the power network, and affecting a change in the power flowing through network components and voltage magnitudes and angles at the nodes of the power network by actually implementing the finally obtained values of controlled variables/parameters after evaluating step finds a good power system or alternatively a power network without any overloaded components and under/over voltages, which finally obtained controlled variables/parameters however are stored in case of simulation for acting upon fast in case the simulated event actually occurs.

2. A method as defined in claim 1 wherein loadflow calculation involving formation and solution of super super decoupled loadflow model, employing simultaneous (1V, 1θ) iteration scheme is characterized in that it involve only one time calculation of real and reactive power mismatches in an iteration along with modified real power mismatch calculation, depending on super super decoupled loadflow model used, either by:

$$RP_p = \left[(\Delta P_p/V_p) - \sum_{q=1}^{m} G_{pq}\Delta V_q\right]/V_p \text{ for all nodes or} \quad (74)$$

$$RP_p = \left[(\Delta P_p/V_p) - \sum_{q=1}^{m} G_{pq}\Delta V_q - (g_p'\Delta V_p)\right]/V_p \text{ for } PQ\text{-nodes, and} \quad (75)$$

$$RP_p = \left[(\Delta P_p/V_p) - \sum_{q=1}^{m} G_{pq}\Delta V_q\right]/V_p \text{ for } PV\text{-nodes} \quad (76)$$

OR $$RP_p = [\{[\Delta P_p' + (G_{pp}'/B_{pp}')\Delta Q_p']/V_p\} - (g_p'\Delta V_p)]/V_p \text{ for } PQ\text{-nodes} \quad (92)$$

$$RP_p = \left[(\Delta P_p/V_p) - \sum_{q=1}^{m} G_{pq}\Delta V_q\right]/(K_p * V_p) \text{ for } PV\text{-nodes} \quad (93)$$

wherein, m is the number of PQ-nodes, and the symbol 'Δ' preceding any variable represents mismatch or correction in the variable.

* * * * *